(12) United States Patent
Main et al.

(10) Patent No.: US 12,544,475 B2
(45) Date of Patent: Feb. 10, 2026

(54) FRAGRANCE SYSTEM

(71) Applicant: ZENAURA LIMITED, London (GB)

(72) Inventors: David Main, London (GB); Stephen Jackson, London (GB); Martin Riddiford, London (GB); Ben Henley, London (GB); Jonathan Chan, London (GB)

(73) Assignee: ZENAURA LIMITED, London (GB)

( * ) Notice: Subject to any disclaimer, the term of this patent is extended or adjusted under 35 U.S.C. 154(b) by 1125 days.

(21) Appl. No.: 16/761,967

(22) PCT Filed: Nov. 6, 2018

(86) PCT No.: PCT/GB2018/053215
§ 371 (c)(1),
(2) Date: May 6, 2020

(87) PCT Pub. No.: WO2019/086910
PCT Pub. Date: May 9, 2019

(65) Prior Publication Data
US 2021/0187144 A1  Jun. 24, 2021

Related U.S. Application Data

(60) Provisional application No. 62/598,510, filed on Dec. 14, 2017.

(30) Foreign Application Priority Data

Nov. 6, 2017  (GB) .................................... 1718324

(51) Int. Cl.
*A61L 9/12* (2006.01)
*A61L 9/04* (2006.01)
(Continued)

(52) U.S. Cl.
CPC ............... *A61L 9/125* (2013.01); *A61L 9/044* (2013.01); *A61L 9/12* (2013.01); *A61L 9/122* (2013.01);
(Continued)

(58) Field of Classification Search
CPC . A61L 9/044; A61L 9/12; A61L 9/122; A61L 9/125; A61L 2209/11;
(Continued)

(56) References Cited

U.S. PATENT DOCUMENTS 5,876,678 A * 3/1999 Harrell ...................... A61L 9/03
422/123
6,481,639 B1 * 11/2002 Pozzo ..................... A61L 9/122
239/57
(Continued)

FOREIGN PATENT DOCUMENTS

WO    2017/053553 A1    3/2017

OTHER PUBLICATIONS

International Search Report, dated May 24, 2019, issued in International Application No. PCT/GB2018/053215.

*Primary Examiner* — Brendan A Hensel
(74) *Attorney, Agent, or Firm* — Leason Ellis LLP

(57) ABSTRACT

A fragrance system for a room, building or other environment, the system including (a) a stand or other form of base and (b) one or more portable fragrance objects, each portable fragrance object providing a fragrance and configured to rest on the stand or base. The stand or base includes one or more fans or other air movement system arranged to release fragrance from one or more of the fragrance objects.

24 Claims, 32 Drawing Sheets

(51) Int. Cl.
  *B05B 12/00* (2018.01)
  *H04W 88/00* (2009.01)
(52) U.S. Cl.
  CPC .......... *B05B 12/002* (2013.01); *B05B 12/004* (2013.01); *H04W 88/00* (2013.01); *A61L 2209/11* (2013.01); *A61L 2209/12* (2013.01); *A61L 2209/133* (2013.01)
(58) Field of Classification Search
  CPC ........... A61L 2209/12; A61L 2209/133; B05B 11/00; B05B 12/002; B05B 12/004; H04W 88/00; B60H 2003/0042; B60H 2003/0064; B60H 3/0035
  See application file for complete search history.

(56) References Cited

U.S. PATENT DOCUMENTS

| | | | | |
|---|---|---|---|---|
| 7,824,051 | B2* | 11/2010 | Walter | A47G 19/025 |
| | | | | 362/101 |
| 10,913,539 | B2* | 2/2021 | Fantuzzi | B01F 25/00 |
| 2012/0067970 | A1* | 3/2012 | Hossein | B60H 3/0028 |
| | | | | 239/34 |
| 2018/0028985 | A1* | 2/2018 | Ansley | B05B 7/265 |
| 2018/0369442 | A1* | 12/2018 | Kelsen | G06K 7/10297 |
| 2019/0085852 | A1* | 3/2019 | Brown | G05D 1/0011 |

* cited by examiner

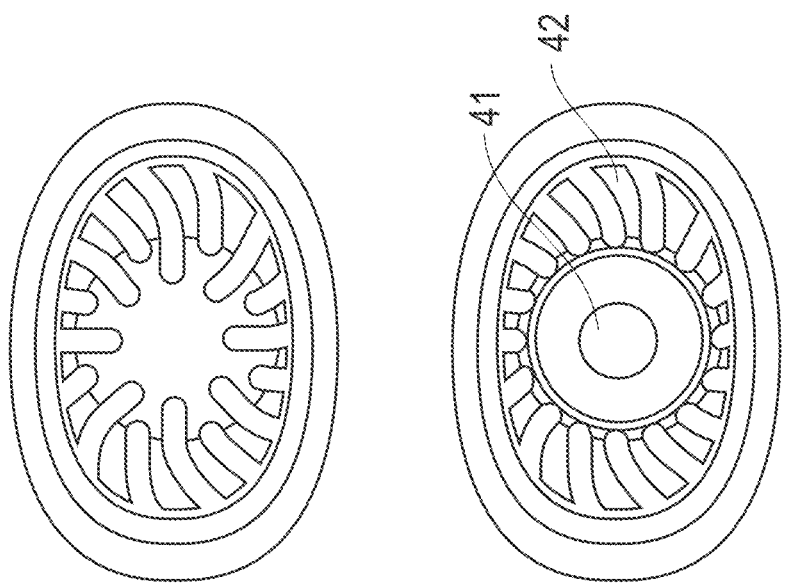
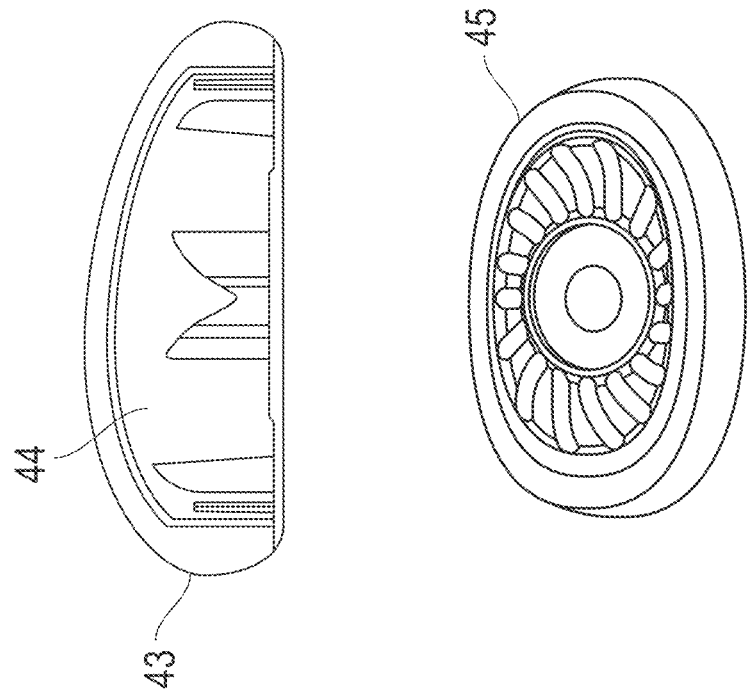
Figure 4

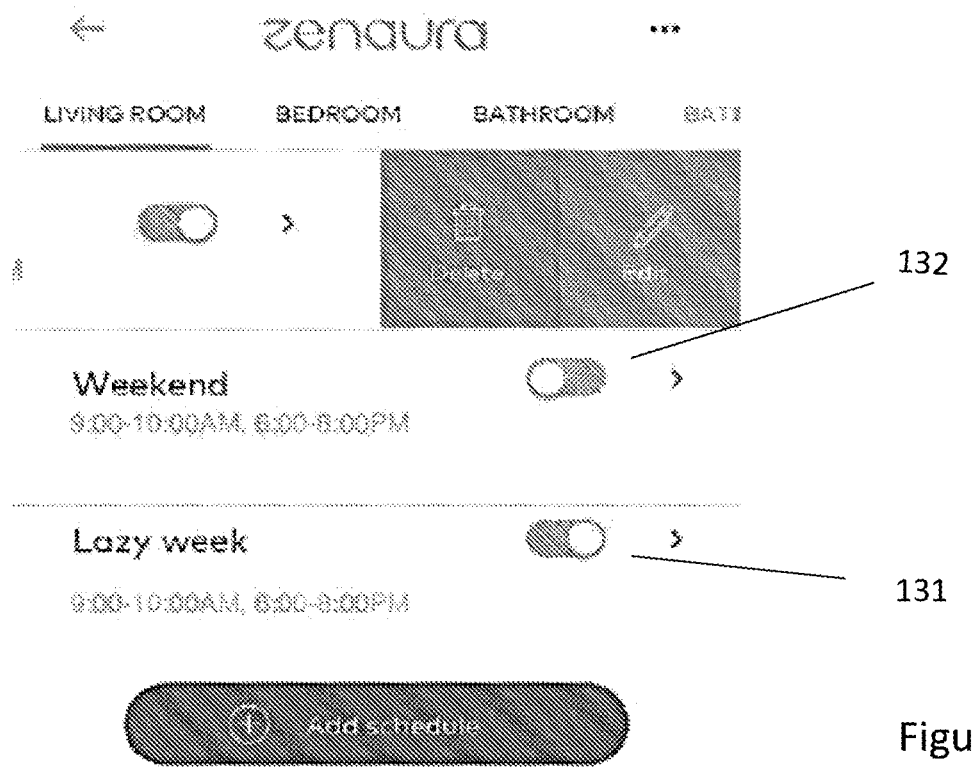
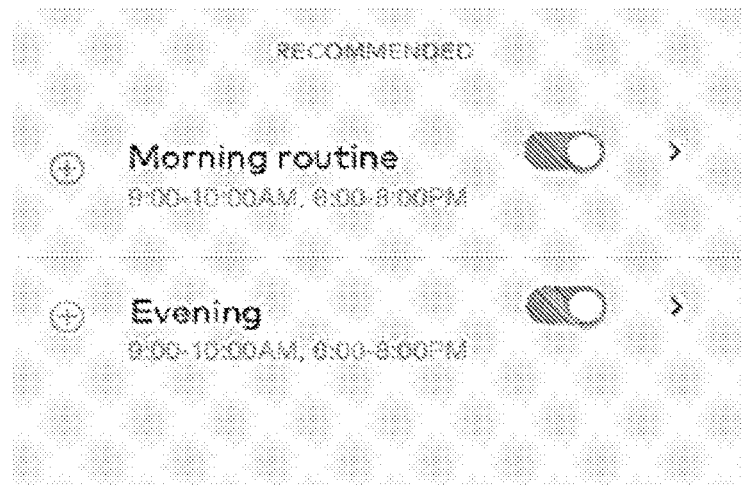
Figure 16

FRAGRANCE SYSTEM

CROSS REFERENCE TO RELATED APPLICATIONS

This application claims the priority of PCT/GB2018/053215, filed on Nov. 6, 2018, which claims priority to GB Application No. GB1718324.5, filed on Nov. 6, 2017, and U.S. Provisional Application No. 62/598,510, filed on Dec. 14, 2017, the entire contents of each of which being fully incorporated herein by reference.

BACKGROUND OF THE INVENTION

1. Field of the Invention

The invention relates to a fragrance system that is fan assisted; the system can provide a fragrance within a room, home, car, office or other environment.

2. Description of the Prior Art

Fragrance systems for home and other environments typically rely on air currents in that environment to carry fragranced air; for example, porous reeds or sticks placed into a bottle of essential oils and scented candles are popular ways of fragrancing a room. But they produce only a very localized fragrance that is hard to control. Essential oil diffusers are also popular; these include a water tank which the user fills with water and adds a few drops of essential oil to the water; a small ultrasonic atomizer generates a fine mist of fragranced air. These devices can be turned on and off, but regularly replenishing these diffusers with water and essential oils can be somewhat messy and inconvenient.

SUMMARY OF THE INVENTION

The invention is a fragrance system for a room, building or other environment, the system including (a) a stand or other form of base and (b) one or more portable fragrance objects, each portable fragrance object providing a fragrance and configured to rest on the stand or base; the stand or base including one or more fans or other air movement system arranged to release fragrance from one or more of the fragrance objects.

Appendix 1 provides a more comprehensive overview of the key features.

BRIEF DESCRIPTION OF THE DRAWINGS

Implementations of the invention will be described, referring to the following Figures:

FIG. 4 are cross sectional and bottom views of the portable fragrance object.

FIGS. 11-20 are screenshots from a companion smartphone app.

DETAILED DESCRIPTION

One implementation of the invention is a fragrance system including (a) a stand or other form of base and (b) one or more portable fragrance objects, each portable fragrance object providing a desired fragrance and configured to rest on the stand or base; the stand or base including one or more fans or other air movement system arranged to release fragrance from one or more of the fragrance objects.

Figure 1:
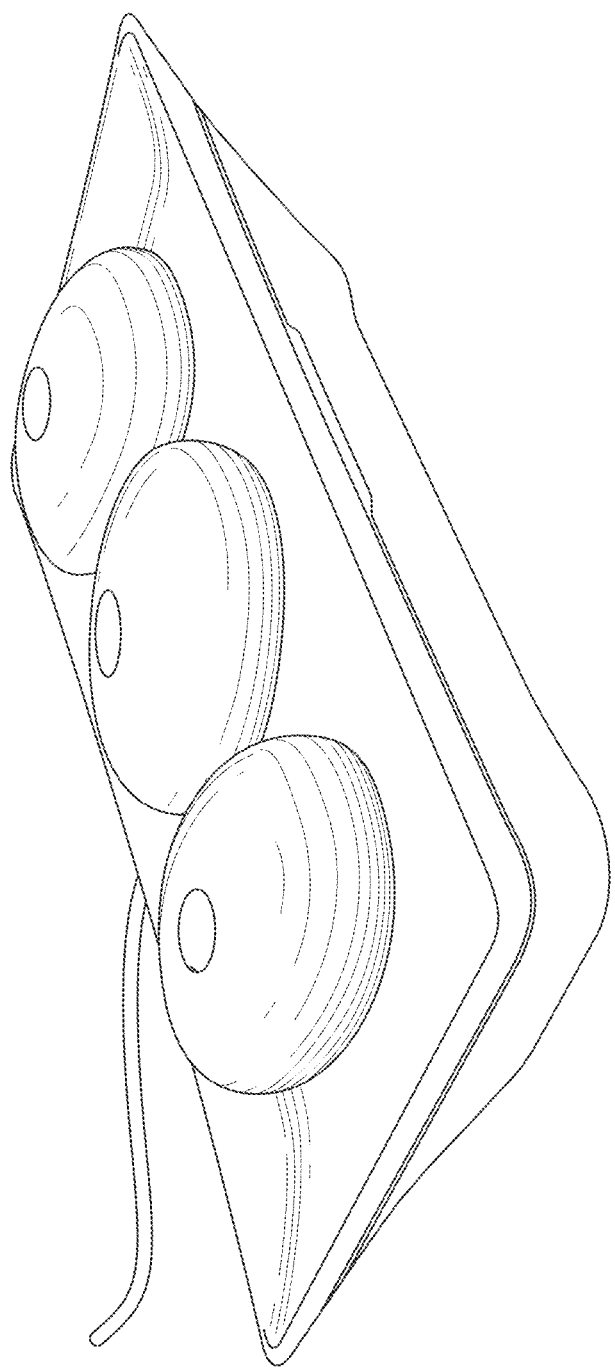
FIG. 1 is an image of an implementation of the invention, with three portable fragrance objects placed on a stand.

FIG. 1 shows an implementation of the fragrance system called the ZenAura fragrance system. The system has three portable fragrance objects, each pebble or ovoid in shape, placed on a base. These objects are sometimes referred to as 'Pearls' in this description. The base is sometimes referred to as a 'Diffuser'. Within the base are positioned three, very quiet axial fans—one below each pebble shaped fragrance object. Each fan can be activated to blow air over and past the fragrance object positioned above it; within each fragrance object is fragrance infused substrate, in this case an EVA (Ethylene-vinyl acetate) matrix that is infused with a fragrance or mix of fragrances. Different variants of the three 'Pearl' system are possible: for example a stand with a single fan, supplying air past a single 'Pearl'. This system is called the ZenAura system.

The ZenAura fragrance system has an aesthetic design and does not need to be hidden away; it can be placed in prominent areas in a room and that in turn means that effective fragrancing is possible; less attractive devices tend to get hidden away, which in turn reduces their effectiveness. It is a connected device, and yet is robust and low cost to manufacture. It does not use any liquids; it cannot cause spills, unlike conventional diffusers that use sticks placed into a fragranced oil. Because it uses powered fans, it is not reliant on air currents within a room to distribute the fragrance; it is hence far more effective in comprehensively fragrancing a room compared to conventional fragrance diffusers, which tend to produce a strong localised scent, but are unable to distribute that scent more widely in a room. Also, because the speed of the fans can be increased, it is possible to rapidly fragrance a room, something a conventional diffuser cannot do. And likewise, turning the fans off causes the fragrancing to rapidly cease. The fans can be controlled from the stand or an application running on a device, such as a smartphone or smartwatch etc. A user can hence readily and easily start and stop the controlled release of fragrance into a room, which is not possible with a conventional fragrance diffuser.

The fragrance system can automatically track how long and at what speed a fan has been active for its associated fragrance object; that enables the system to work out when the fragranced EVA matrix is likely to need replacing; an alert can be sent to the companion application, enabling the user to purchase a replacement via the companion application, for postal etc. delivery.

Figure 2:
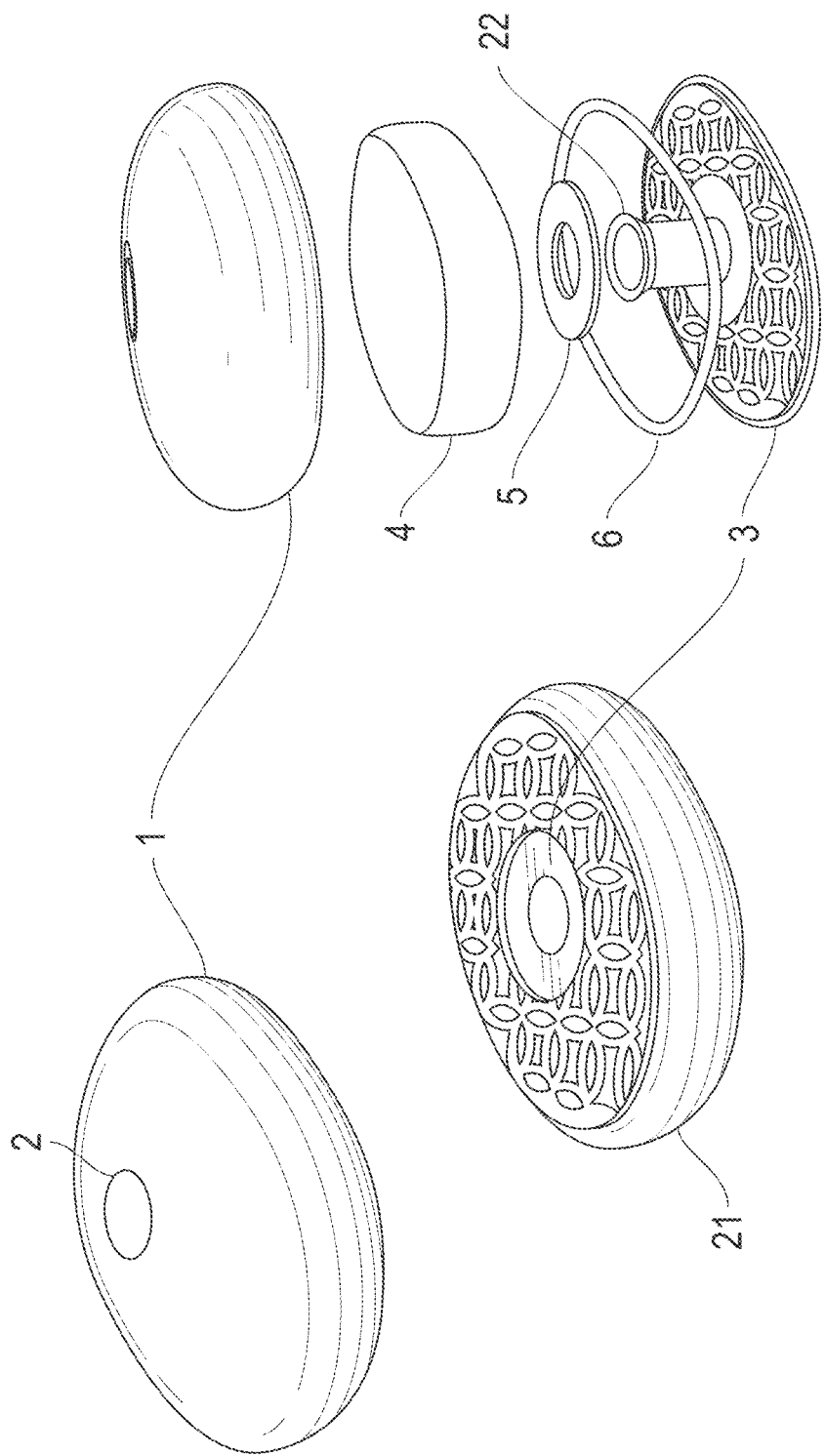
FIG. 2 are top, bottom and exploded views of a portable fragrance object.

FIG. 2 shows the fragrance object or Pearl in more detail. Each Pearl is made of a glass body 1; a logo 2 decorates the top of the glass body 1. Within each glass body 1 is an EVA matrix 4 infused with one or multiple fragrances. The EVA matrix 4 sits on a poly-propylene base 4 with a central tower 22; that central tower 22 engages with a cylindrical hole in the EVA matrix 4 to define certain components of a replaceable assembly. The underside of the Pearl is shown at 21; this shows the central chamber through which air is blown by the axial fan. Matrix 4 is secured to the base 3 using an adhesive ring 6. The glass body 1 of the Pearl seats over the replaceable assembly, once fully assembled. The underside view shows the base 3 and glass body 1 assembled together with the glass body covering the EVA matrix 4 and seated upon the base 3. An RFID tag 5 is sandwiched between the bottom of the matrix 4 and the base 4; it enables the base to identify and authenticate the Pearl; counterfeit Pearls will be recognised and will not work; the base will not activate a fan for a Pearl unless the handshake with a RFID tag shows that the Pearl is authentic.

Figure 3:
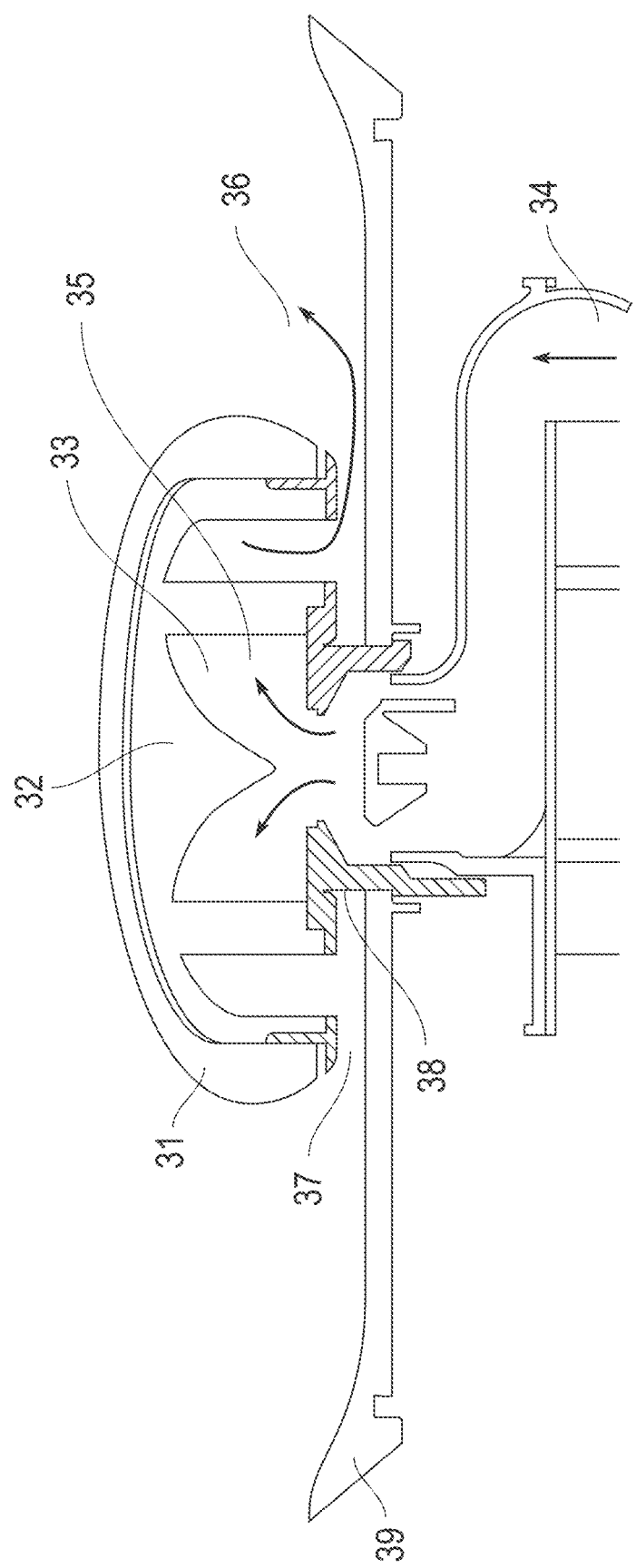
FIG. 3 is a cross sectional view of a portable fragrance object resting on the stand, showing the air path.

The surface of the EVA matrix is shaped to maximise the surface area that is presented to the air blown in by the associated fan and to then direct that fragranced air out of Pearl and into the room. FIG. 3 shows this more clearly. The glass shell of the Pearl 31 sits over EVA matrix 32. The underside of the EVA matrix 32 includes deep channels, groves or arches. These are designed to maximise the surface areas of the EVA matrix over which air form the fan passes: air 34 flows up from the fan at high speed and up through the centre of the EVA matrix 32. Air 35 then flows over and past the contoured surface of the matrix 32 and then out of the Pearl through the holes in the base of the Pearl and then completely out of the fragrance system at 36. When the fan is operational, then Pearl 31 is lifted up from the stand 39 by mounting 38; this exposes an gap 37 between the stand 39 and the base of the Pearl 31 through which the fragranced air 36 can flow.

FIG. 4 shows the Pearl: glass body 43 encloses EVA matrix 44; the polypropylene base 45 includes a central hole through which air form the fan passes into the Pearl, and channels 42 through which fragranced air exits form the Pearl. The channels 42 in the base 45 can be seen to align with the deep grooves in the EVA matrix 44 when the matrix is seated on the base to define an airflow path from the central chamber to the plurality of grooves and out through the plurality of channels 42.

Figure 5:
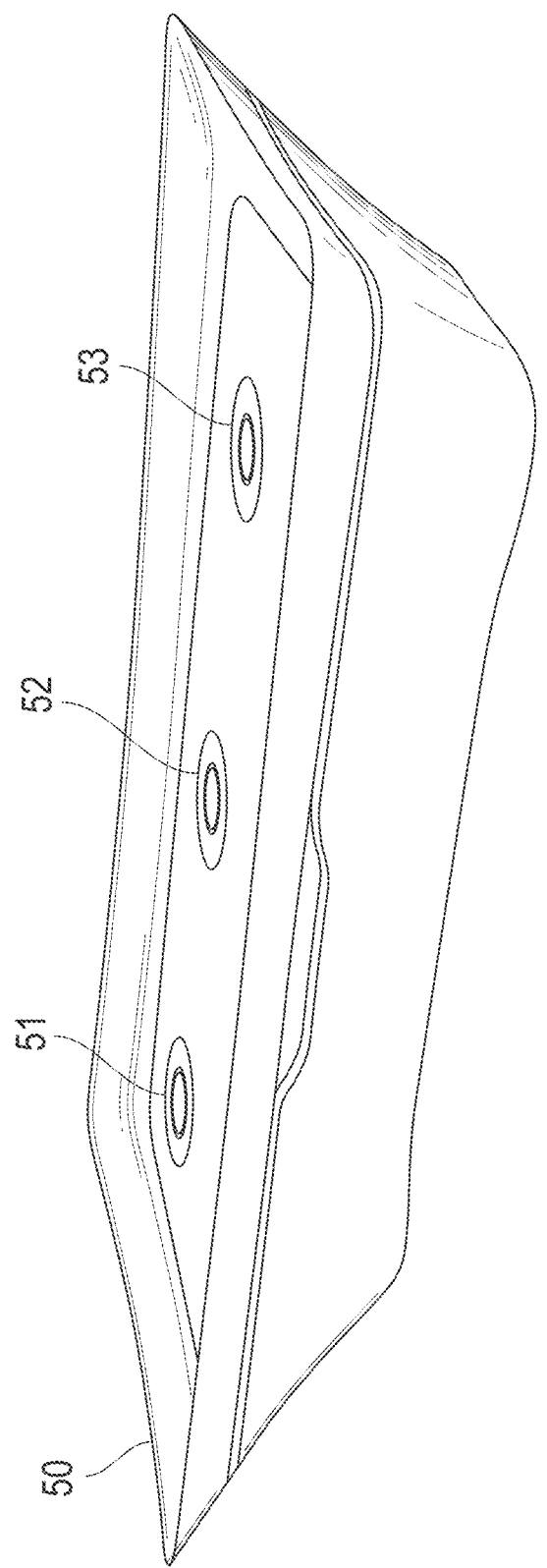
FIG. 5 is a view of the stand.

FIG. 5 shows the stand 50 for three Pearls (not shown). The top of the stand includes an air nozzle 51, 52, 53 for each Pearl. When a fan is active for a specific Pearl, then the associated air nozzle 51, 52, 53, rises up slightly to provide the gap (37 in FIG. 3) through which fragranced air passes. Each nozzle 51, 52, 53 includes a ring of light; that light is activated (for example, a short sequence of pulses of light) when a Pearl approaches a nozzle (as detected by the RFID-based authentication handshake); this shows the user that the Pearl is recognised and that the device is live and will work with that Pearl. Whilst a fan is in use, the associated nozzle is also illuminated; as the Pearl has a glass body, the illumination form the nozzle passes up through the body of the Pearl and the surface glows. The nozzle can also automatically rise up to engage the central aperture in the base of the Pearl; this enables the user to accurately and rapidly correctly locate the Pearl on the Nozzle.

Figure 6:
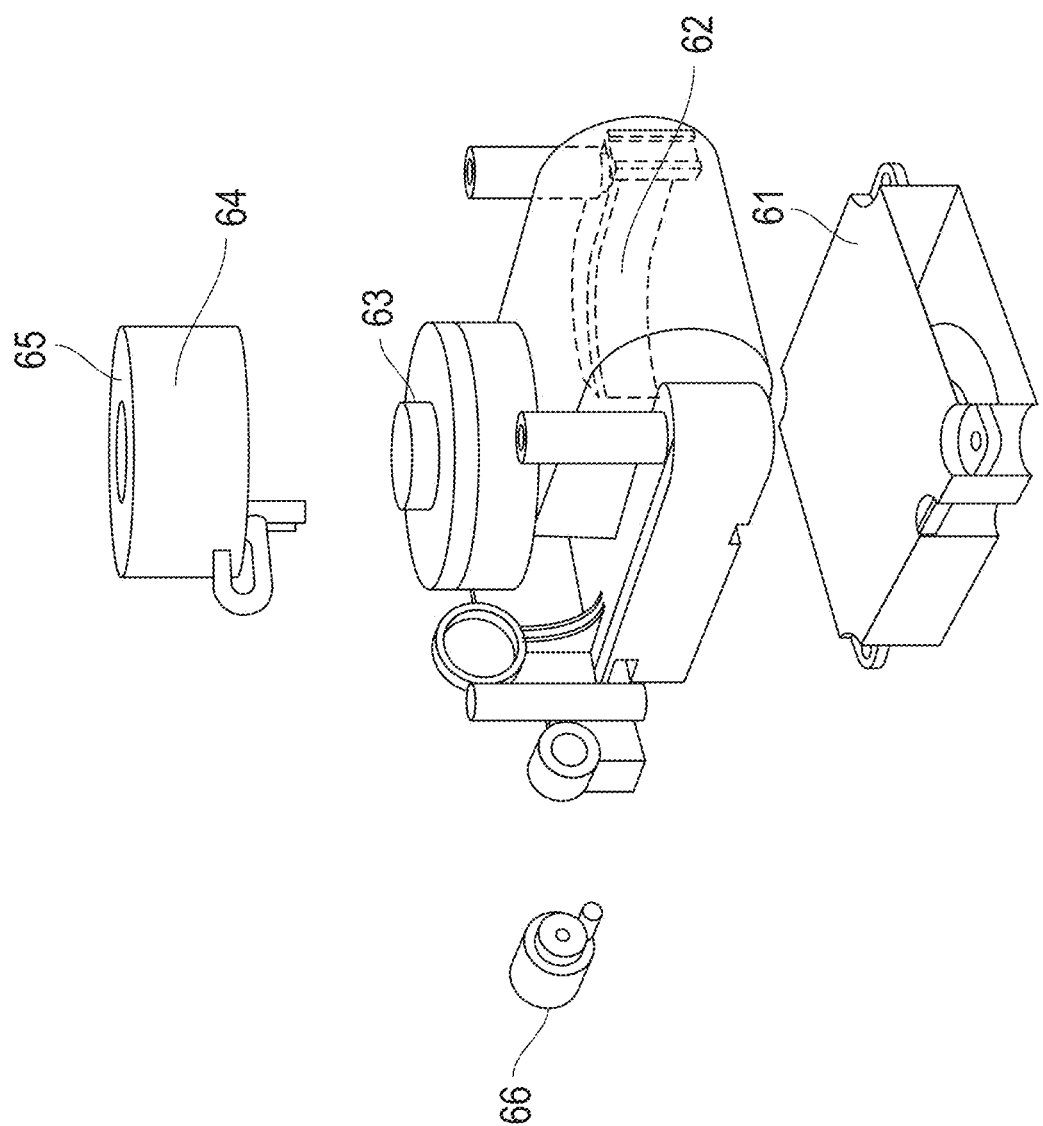
FIG. 6 shows the fan unit; there are three in the stand shown in FIG. 1.

FIG. 6 shows the air movement system for each Pearl. This includes a centrifugal blower fan 61 that sits within a polycarbonate air box 62. The top surface 63 of the air box 62 supports the air nozzle 64; the air nozzle 64 lifts up under the action of cam 66 when the fan is activated. The top surface 65 of the air nozzle 64 in turn lifts up the Pearl from the stand.

Figure 7:
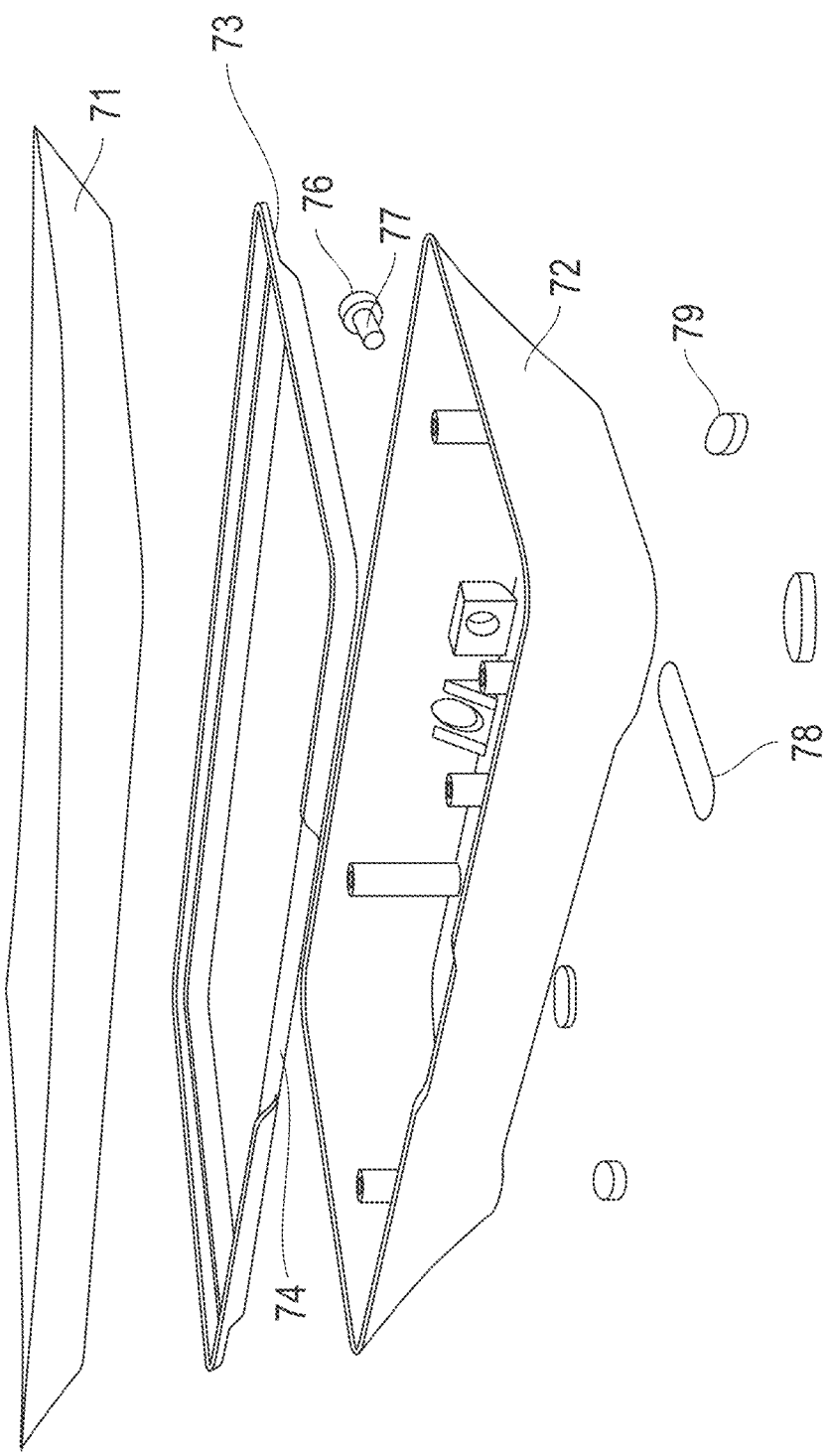
FIG. 7 is an exploded view of the stand.

FIG. 7 shows a cross-section through the stand. The stand contains one or more of the air movement systems shown in FIG. 6. It includes a top plate 71, sitting over a base 72. A trim panel 73, with a product logo 74, sits between the base 72 and the top plate 71. An on-off power button 76 with a mask 77 is fitted within aperture 70, which is next to the power cable (not shown) feed aperture. A product label 78 is positioned on the underside of the base 72. Four feet 79 are also provided on the base 72.

Figure 8:
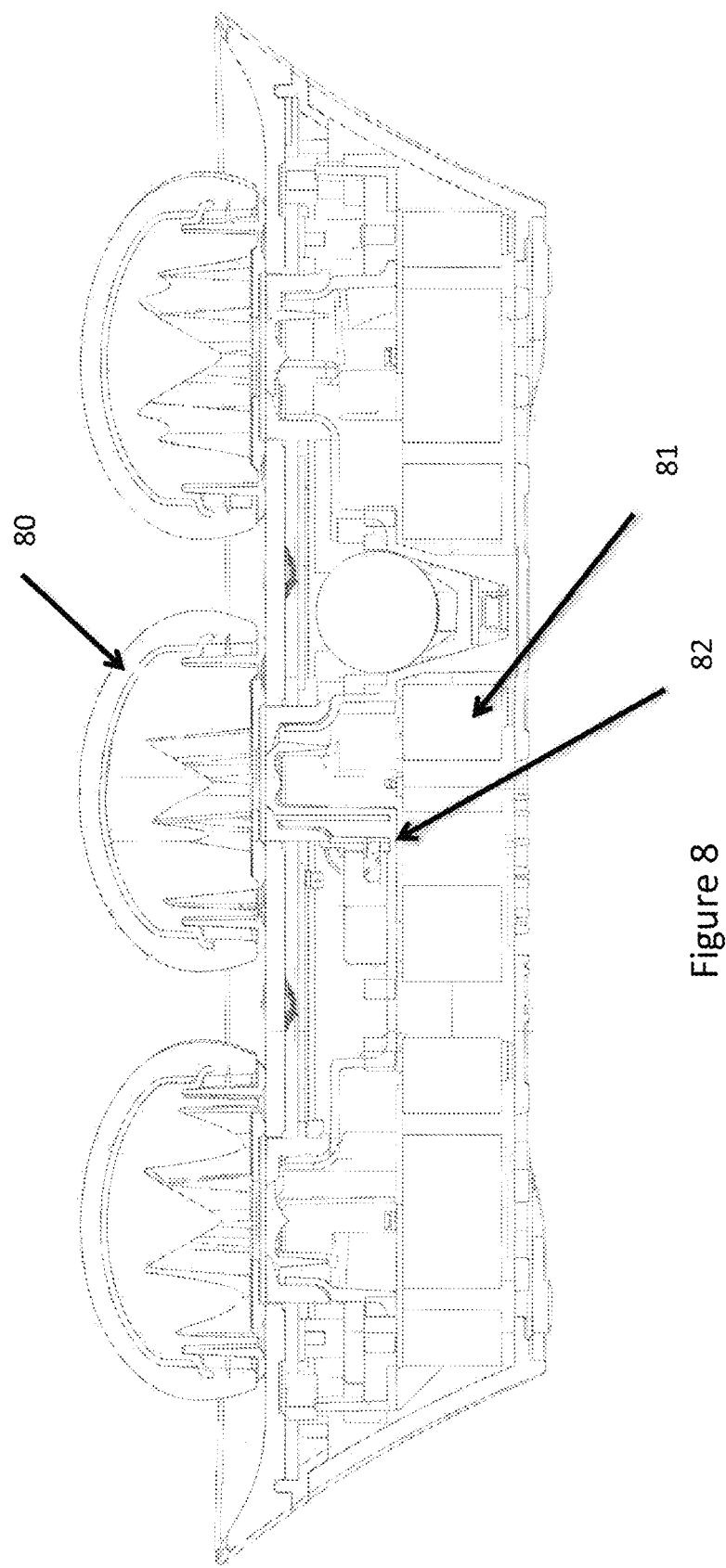
FIG. 8 is a cross sectional view of a portable fragrance object resting on the stand.
Figure 9:
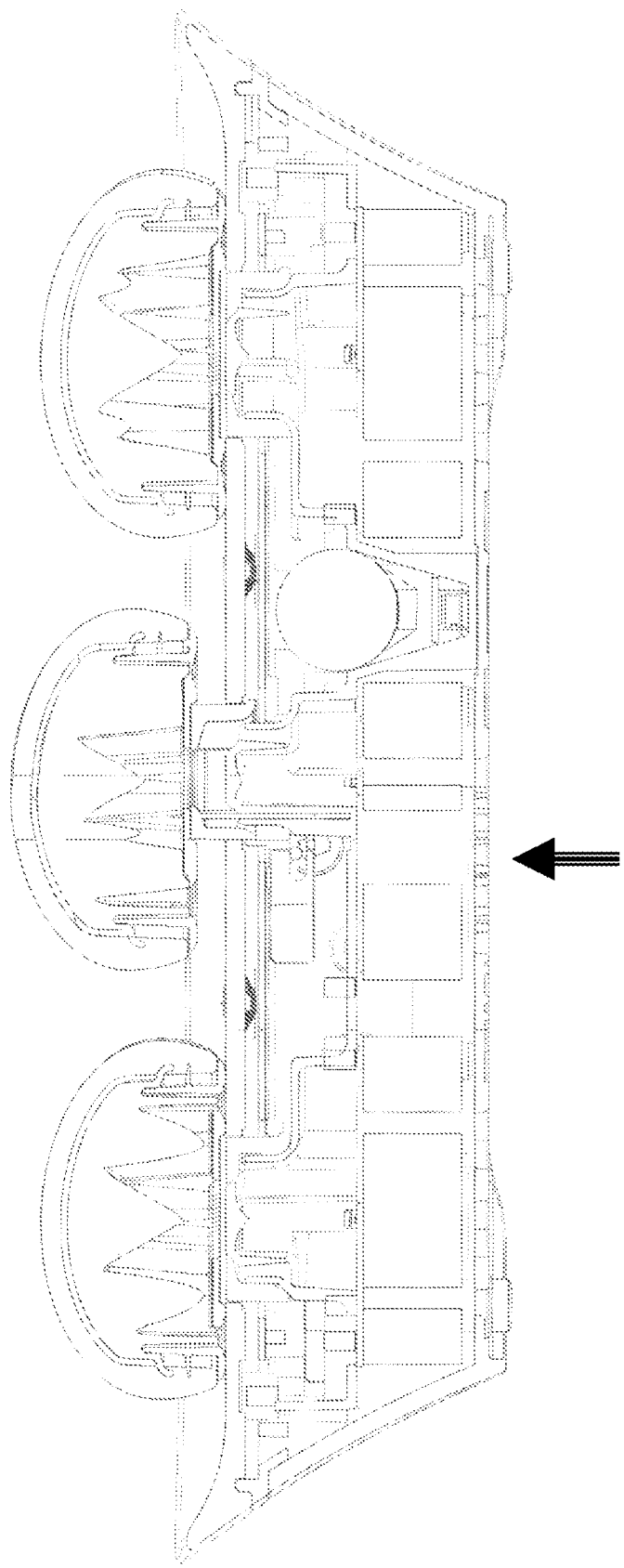
FIG. 9 is a cross sectional view of a portable fragrance object lifted up from the stand and showing the airflow path.
Figure 10:
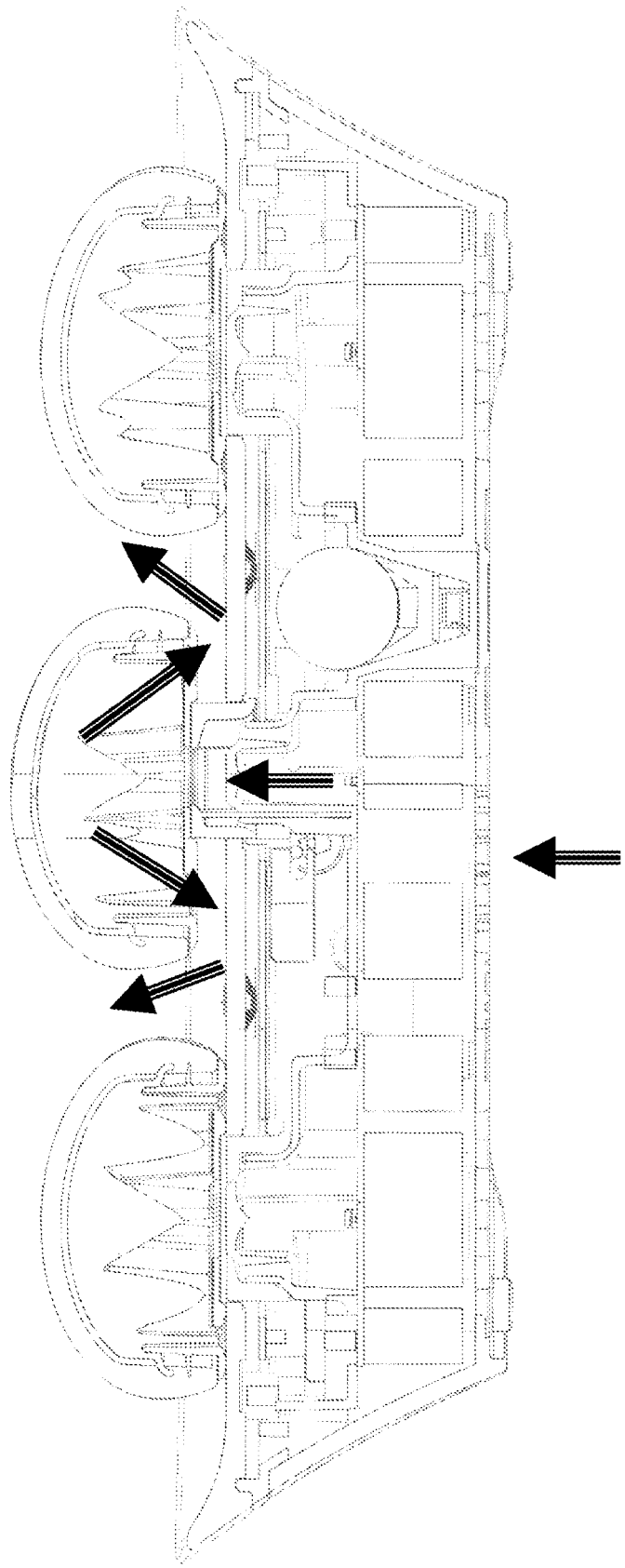
FIG. 10 is a cross sectional view of a portable fragrance object rested back on the stand.

FIGS. 8, 9 and 10 are cross-section through the stand with a Pearl on the stand. FIG. 8 shows the glass Pearl 8 resting on the stand. Centrifugal fan 81 is inactive. Eccentric drive pin 82 runs within a slot in a nozzle and is at its lowest point; a small drive motor can lift the drive pin 82 up from this position when the fan 81 is active in order to lift the Pearl up from the stand, as shown in FIG. 9. The airflow path is shown in FIG. 10: air enters through holes in the base of the stand, drawn in by the centrifugal fan. The fan blows the air up through a central air nozzle and from there into the centre of the Pearl. The air then passes over curved surfaces within the EVA matrix and then out of the small gap around the base of the Pearl and the stand and into the room.

Figure 11:
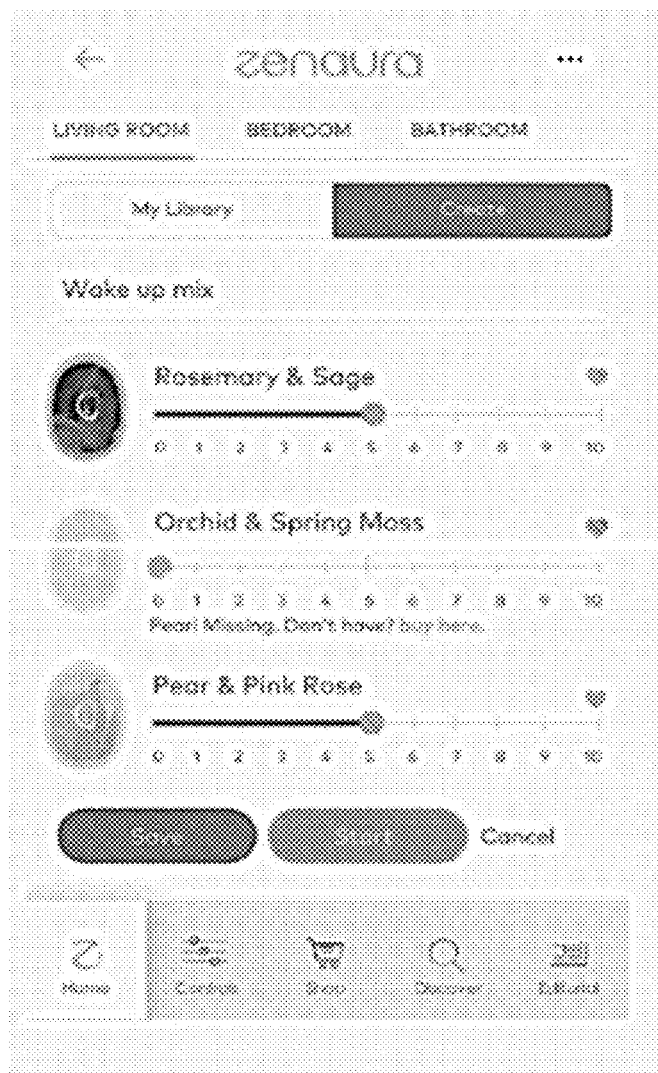
Figure 12:
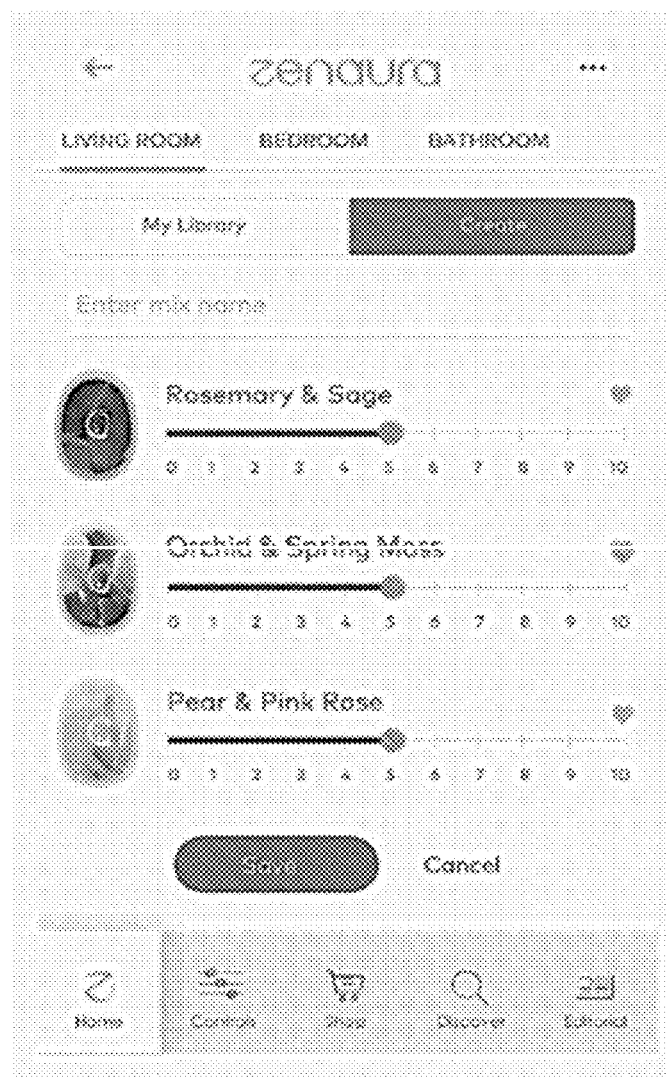

The system is a connected system, with a companion application displaying the specific fragrances of each Pearl on the stand. The application can also control the fan speed and hence the strength of the fragrance delivered by each Pearl. FIG. 11 is a screenshot from the companion application. It shows that there are connected fragrance systems in the living room, bedroom and bathroom; in FIG. 11, the fragrance system in the Living Room is selected (underlining of the phrase 'Living Room' at the top of the screen. In this screen, the user is creating a specific mixture of fragrances for the living room by selecting the desired strength of each of the three available Pearls, 'Rosemary & Sage', 'Orchid & Spring Moss' and 'Pear & Pink Rose'. The strength of 'Rosemary & Sage' is set to level 5. For 'Orchid & Spring Moss', it is set to zero (so the associated fan will not operate at all). For 'Pear & Pink Rose', the strength is set to level 5. The user calls this the Wake up mix'. FIG. 12 shows a different selection, this time with all three fragrance Pearls set to level 5.

Figure 13:
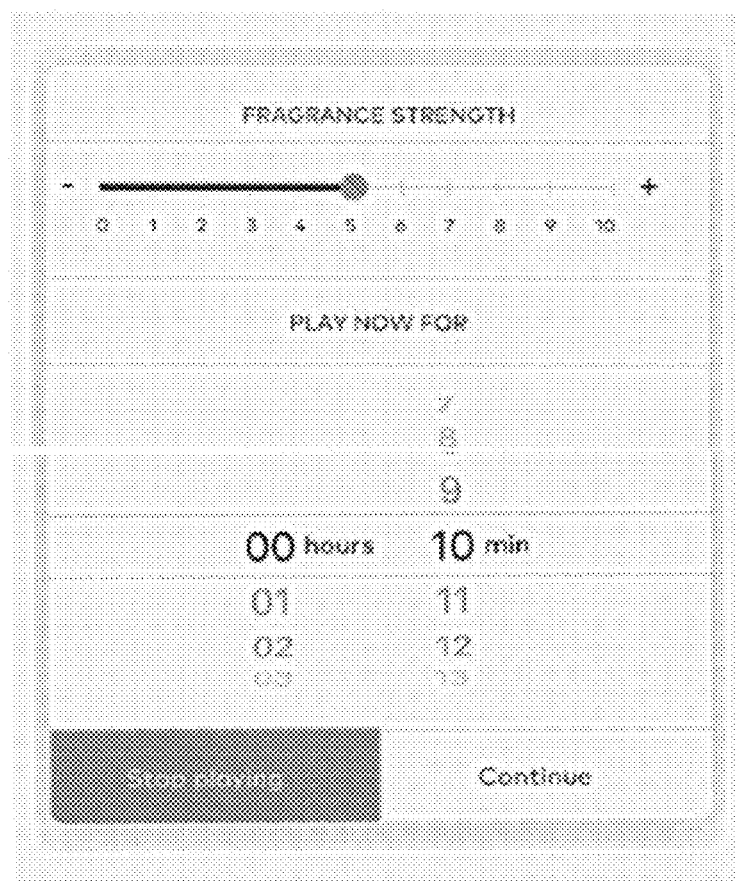

FIG. 13 shows the screen associated with a user selecting a specific Pearl to operate at level 5, for 10 minutes.

Figure 14:
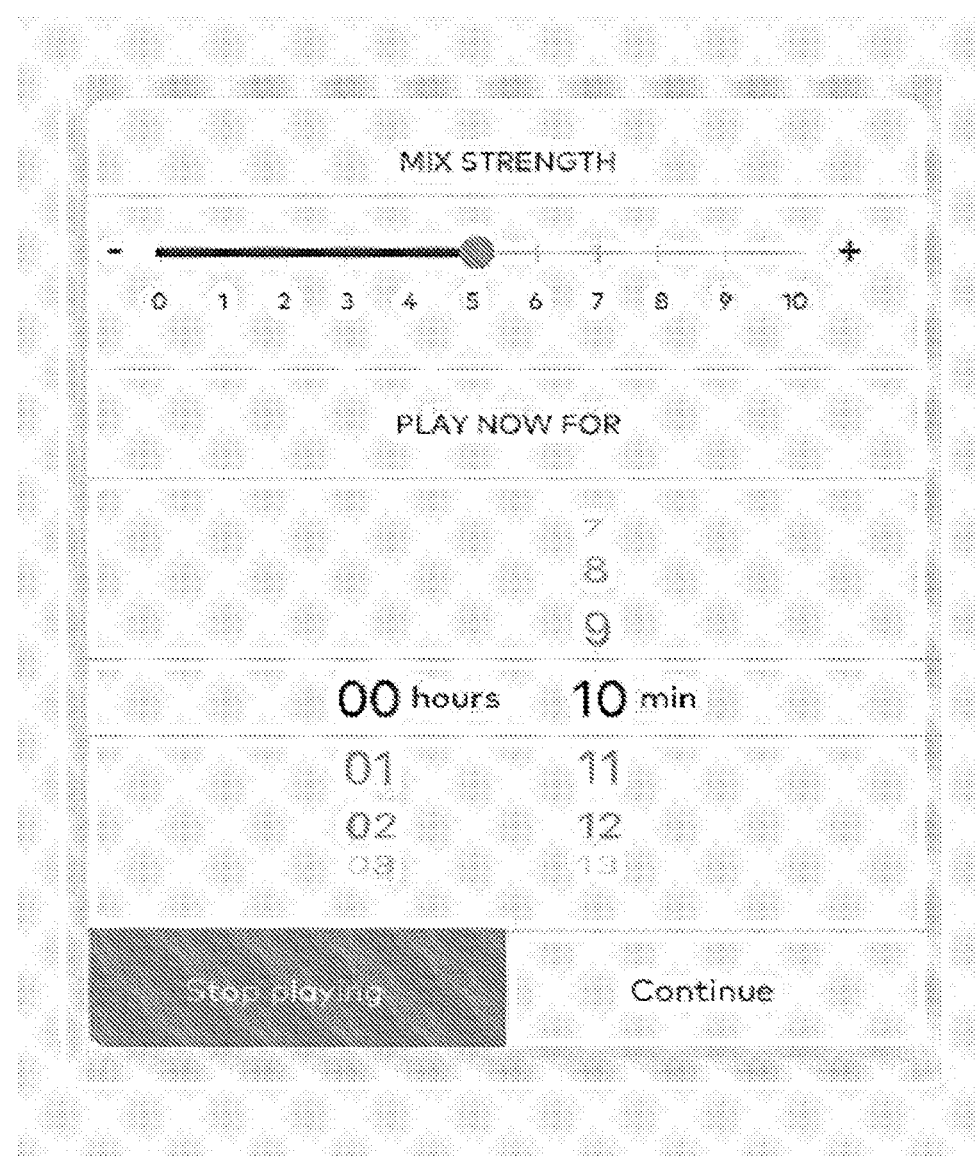

FIG. 14 shows the screen associated with a user selecting a specific mix of Pearls to operate at level 5, for 10 minutes.

Figure 15:
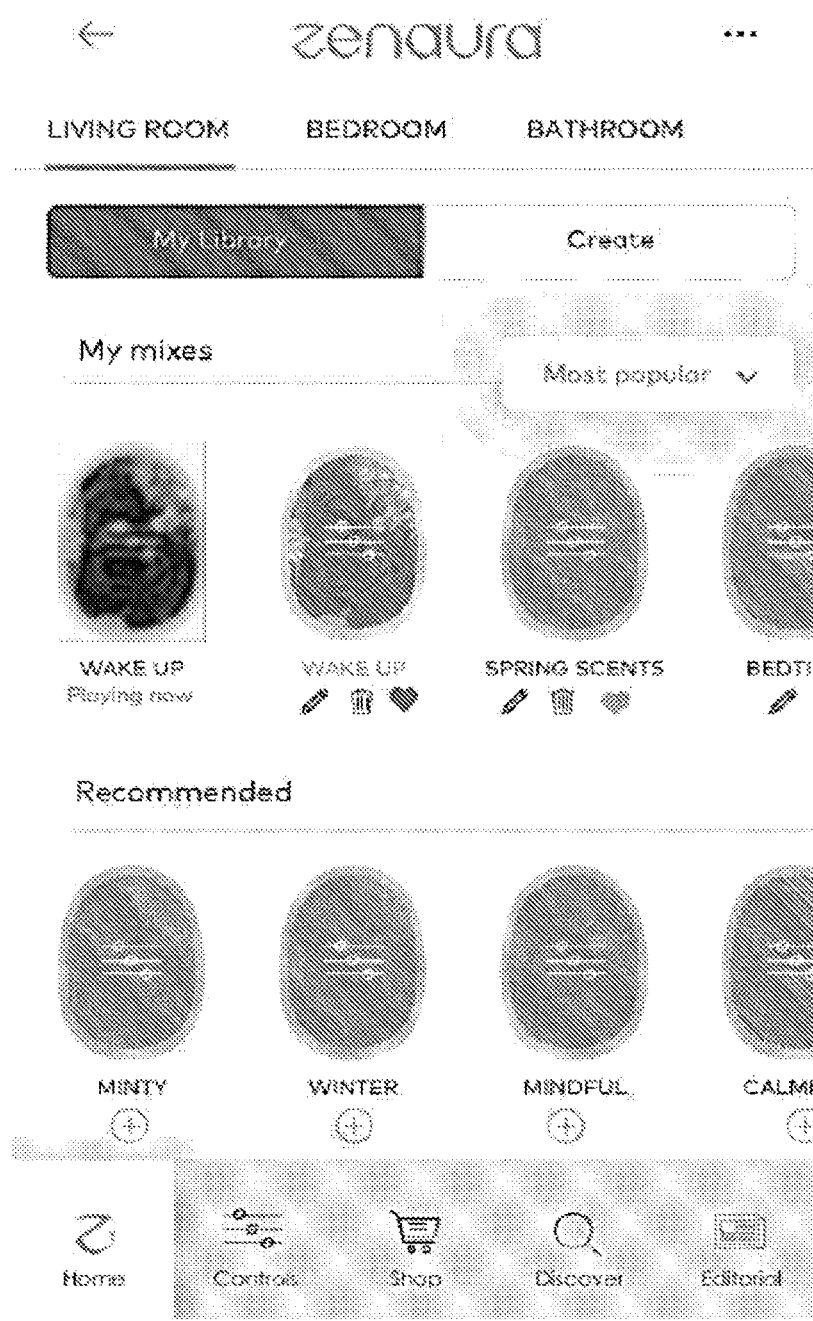

FIG. 15 shows the screen that lists all the fragrance mixes the user has created (under the 'My Mixes' row, including 'Wake up', 'Spring Scents' etc. The application also displays previously curated or created fragrances mixes (under the Recommended row, including 'Minty', 'Winter', 'Mindful'). The user can select any of these and set it to play immediately, for a pre-set duration (as shown in FIG. 12).

Figure 17:
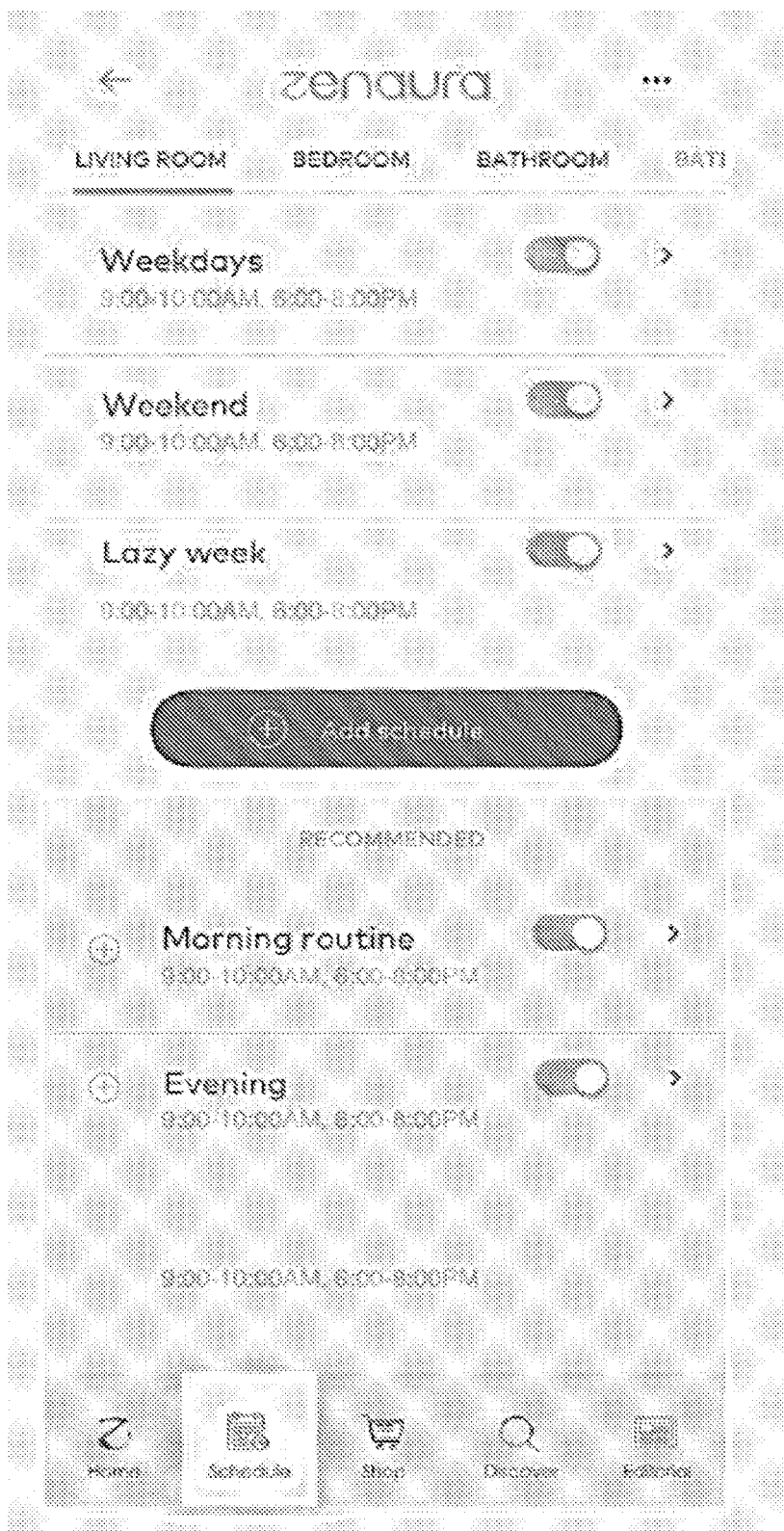
Figure 18:
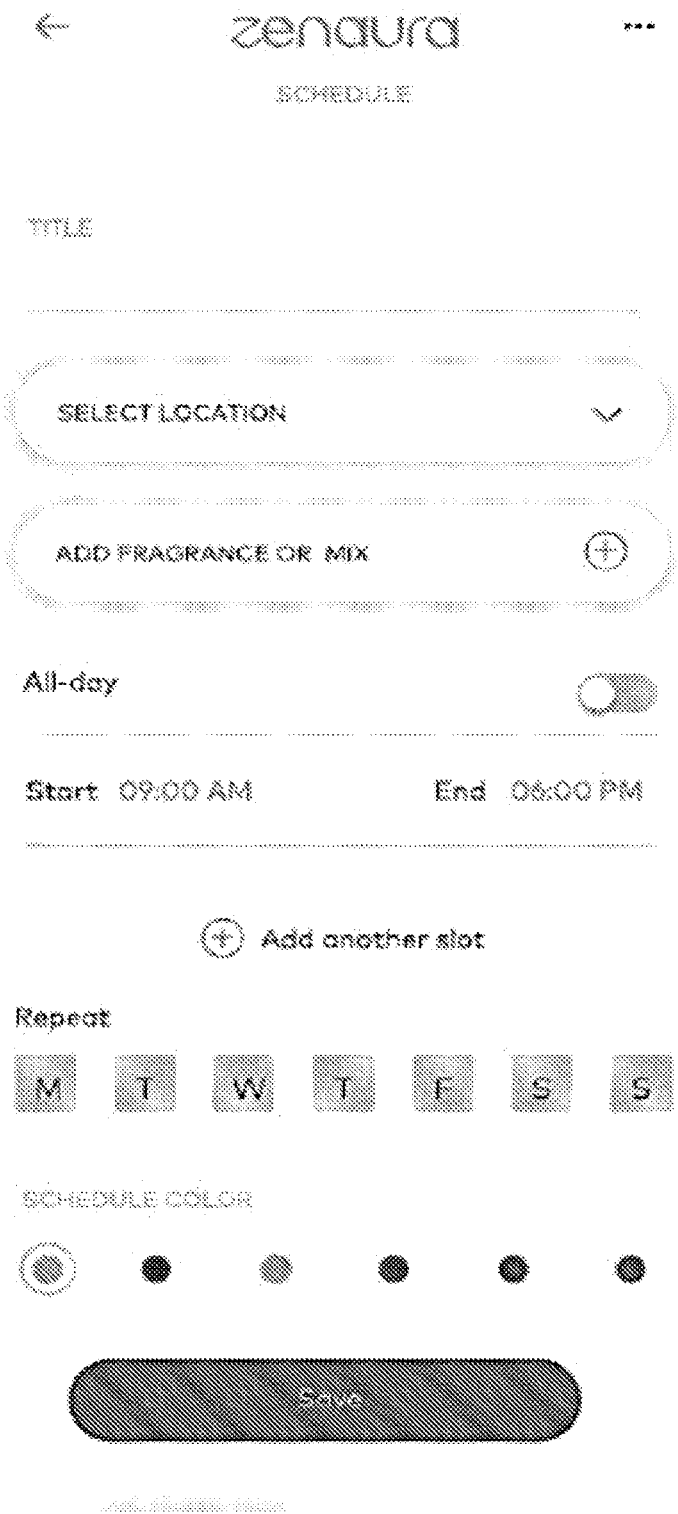
Figure 19:
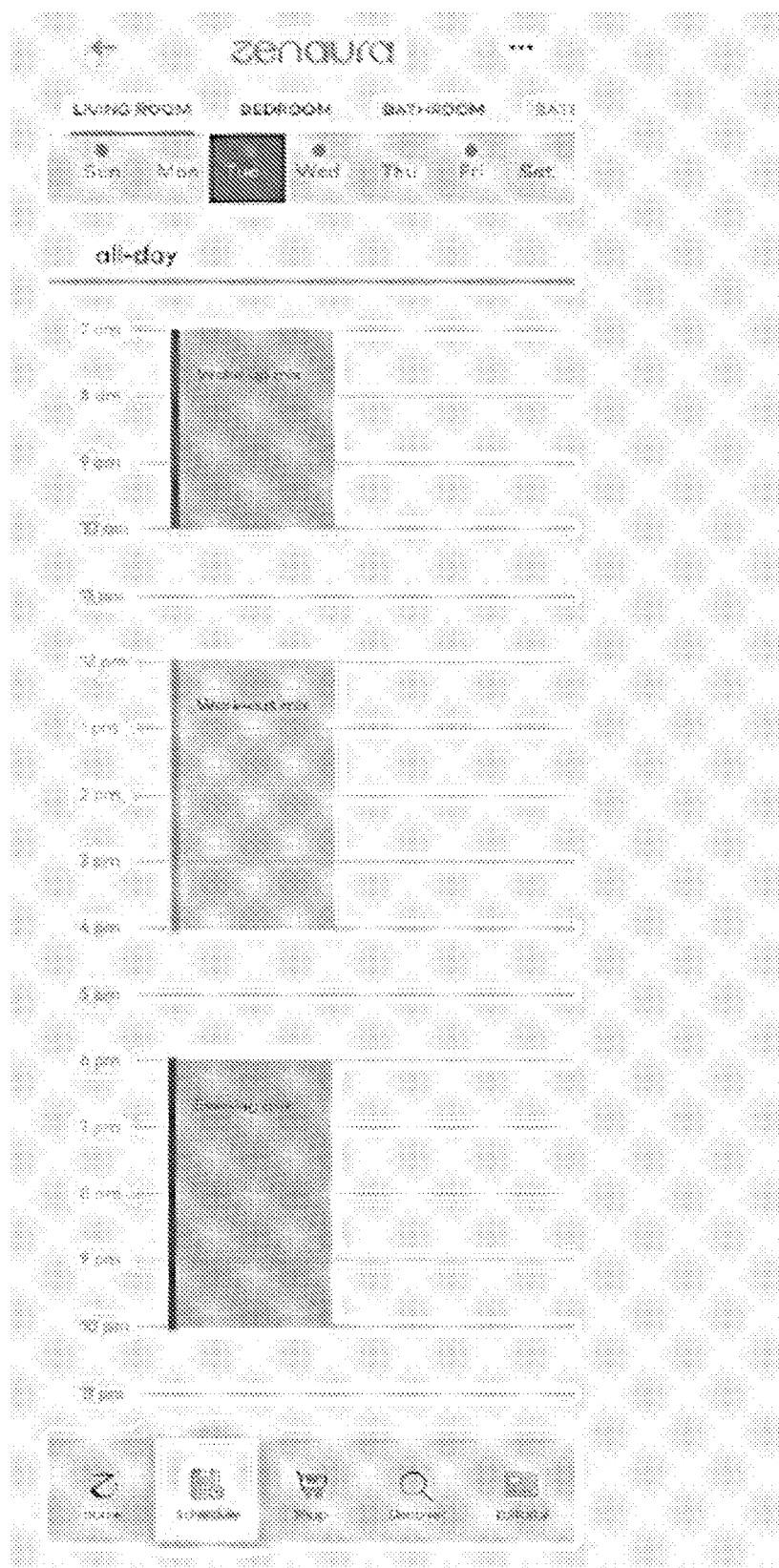
Figure 20:
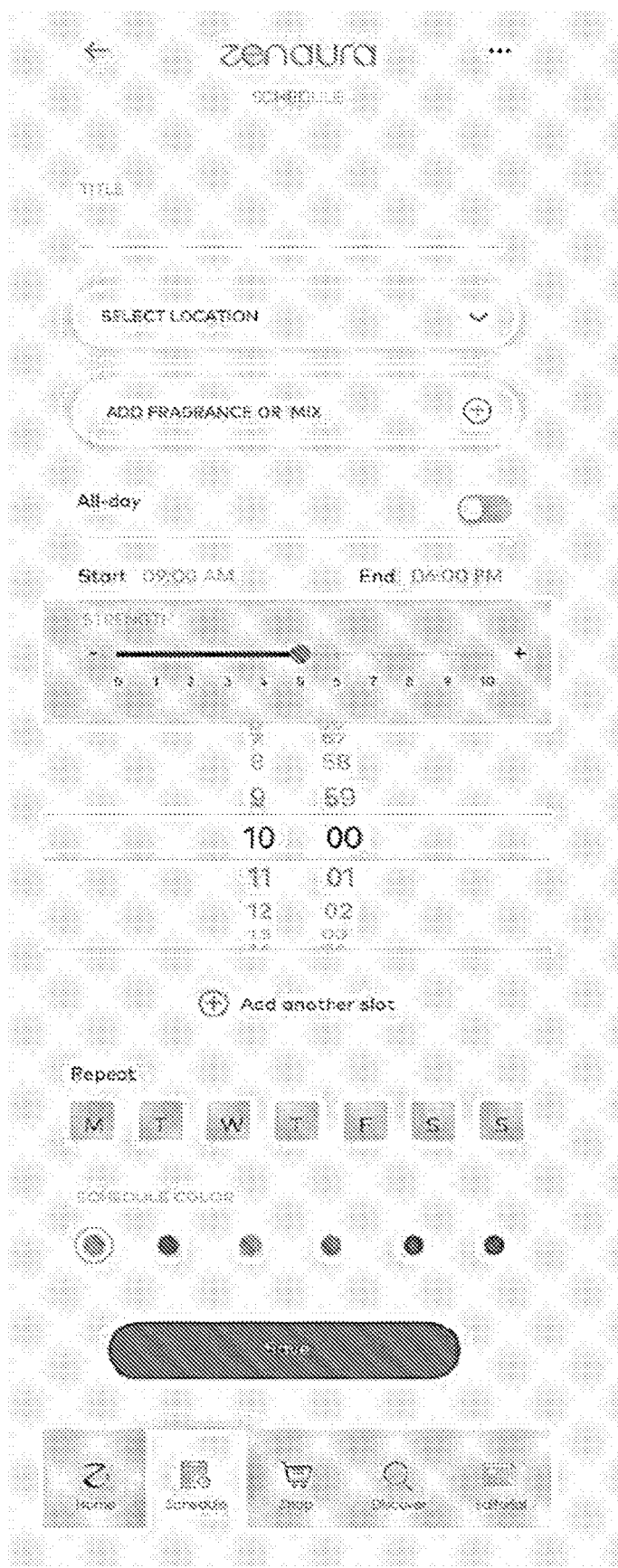

In addition, the user can also create, edit and select a schedule, i.e. times during which a pre-set fragrancing will occur. In FIG. 16, the user has selected the 'Lazy Week' schedule for the living room. This schedule defines the automated operation of the fragrancing system between 9.00-10.00 am and 6.00-8.00 pm during the Monday-Friday week. The slider button 131 is shown activated, whereas the slider button for the weekend, 132, is not activated. FIG. 17 shows a different schedule. FIG. 18 shows the menu screen that enables the user to manually select a specific location, and the fragrance or mix for that location, and the timing that fragrancing will be active for. FIG. 19 shows that these timings can auto-populate a diary or calendar application. FIG. 20 shows how the strength of the fragrancing can also be set through the schedule screen.

Appendix 1

The core features A-J can be generalised as follows:
The Fragrancing System
  A. A fragrance system for a room, building or other environment, the system including (a) a stand or other form of base and (b) one or more portable fragrance objects, each portable fragrance object providing a fragrance and configured to rest on the stand or base; the stand or base including one or more fans or other air movement system arranged to release fragrance from one or more of the fragrance objects.
The Portable Fragrance Object
  B. A portable fragrance object including a fragrance infused substrate or matrix, the object being configured to rest upon a stand or base or be placed upon that stand or base by a user; and configured to permit air, blown from one or more fans or other air movement system positioned in the stand or base, to pass over the fragrance infused substrate and out into a room, building or other environment.
  C. A portable fragrance object that is shaped like a smooth, rounded pebble or a flat-based ovoid, and is configured to rest upon a stand or base or be placed upon that stand or base by a user, and has (a) a wall that encompasses or covers a fragrance infused substrate or matrix and (b) one or more air passageways between the outer surface of the substrate or matrix and the inner surface of the wall.
  D. A portable fragrance object with (a) a wall that encompasses or covers a fragrance infused substrate or matrix, in which the substrate of matrix has a surface that is shaped or contoured to direct incoming air from a fan over channels, grooves, arches or other features in the substrate or matrix to increase the surface area of the substrate or matrix that is exposed to the incoming air.
  E. A portable fragrance object including a fragrance infused substrate or matrix, and an ID chip or device (such as a wireless chip, e.g. an RFID chip) that exchanges data with a base, stand, or other type of dock that includes one or more fans, to authenticate the fragrance object and to hence permit operation of a fan with that fragrance object.
  F. A portable fragrance object including a fragrance infused substrate or matrix, and an ID chip or device (such as a wireless chip, e.g. an RFID chip) that exchanges data with a base, stand, or other type of dock that includes one or more fans, to trigger a light or illumination in the dock when the portable fragrance object is sufficiently close.
  G. A portable fragrance object including a fragrance infused substrate or matrix, and an ID chip or device (such as a wireless chip, e.g. an RFID chip) that exchanges data with a base, stand, or other type of dock that includes one or more fans, to trigger a nozzle or aperture to rise up from the dock, the object being configured to engage with the nozzle or aperture.
  H. A portable fragrance object with (a) a wall that encompasses or covers a fragrance infused substrate or matrix and (b) one or more air passageways between the outer surface of the substrate or matrix and the inner surface of the wall, the air passageways being arranged to take incoming air blown from a fan directed at the substrate or matrix and to pass it over the substrate or matrix to add a fragrance to that air and to then duct the air out from the fragrance object.
Fragrancing Methods
  I. A method of adding fragrance to a room, building or other environment comprising the steps of placing a portable fragrance object as defined above on a stand or base including one or more fans or other air movement system arranged to release fragrance from one or more of the fragrance objects and then activating the fan or air movement system.
  J. A method of adding fragrance to a room building or other environment comprising the steps of:
    (a) placing a portable fragrance object as defined above on a stand or base including one or more fans or other air movement system arranged to release fragrance from one or more of the fragrance objects and then activating the fan or air movement system;
    (b) automatically determining that the fragrance object is coming to the end of its useful life by tracking the extent of its use;
    (c) automatically sending a request to an app and/or remote fulfillment server for a replacement fragrance object to be supplied.

Optional features. Each can be combined with any one or more other optional features and with any of the core features A-J described above.
Fragrance Object Features
  a portable fragrance object is in normal use placed by a user onto the stand or base to engage with an air nozzle connected to a fan or other air movement system
  a portable fragrance object mechanically engages with an air nozzle or other fitting in the stand or base that locates it accurately with respect to an outlet for a fan or other air movement system
  a portable fragrance object is weighted so that it sits securely on the stand or base and seals against the stand or base
  a portable fragrance object has a weight that is sufficient to ensure that the object contacts the stand or base with a seal that is sufficient to prevent the substantial escape of fragrance from the object
  a portable fragrance object includes one or more air holes configured to enable air emerging from the fans or other air movement system in the stand or base to flow in and through the portable fragrance object.
  a portable fragrance object has a base configured to sit in or on the stand or base and has a curved top surface
  a portable fragrance object is generally smooth surfaced, pebble sized object with a longest dimension between 4 cm and 10 cm in length
  a portable fragrance object is between 30 mm and 100 mm tall and between 20 mm and 80 mm wide; in one implementation it is approx. 70 mm tall and 50 mm wide
  a portable fragrance object has a hard, smooth external shell a portable fragrance object has a hard external glass or transparent or semi-transparent or translucent or semi-translucent shell a portable fragrance object has an external shell that protects an end-user from touching the fragrance store inside the object a portable fragrance object includes a single polymer matrix object, such as an EVA object, impregnated with a fragrance.

a portable fragrance object has a translucent or semi-translucent shell surrounding a polymer matrix such as EVA (ethylene-vinyl acetate) which is impregnated with fragrance a portable fragrance object includes a single object that is impregnated with fragrance a portable fragrance object includes a single EVA-based or other matrix that is impregnated with fragrance a portable fragrance object has an actual volume of EVA that is between 10 mL and 50 mL The EVA or matrix is between 20 mm×10 mm×5 mm and 80 mm×60 mm×40 mm and is in one implementation approximately 58 mm×40 mm×16 mm, with an actual volume of EVA is approximately 20 mL or 20 cms3.

surface area of the matrix when new is in the range of 2000 mm$^2$ to 20000 mm$^2$.

a portable fragrance object includes a user-removable seal that seals outlet apertures in the object and is present from manufacture and during transportation and storage a portable fragrance object provides a single desired fragrance made up of a blend of scents different portable fragrance objects, each with a different fragrance, can be activated to produce different combinations of fragrance different portable fragrance objects, each with a different fragrance, can be activated at different times to produce different combinations of fragrance at the required times Fan in the Stand Features a single fan or air movement system is provided in the stand or base for each portable fragrance object the single fan or air movement provided in the stand or base for each portable fragrance object is activated when fragrance from the respective fragrance object is required.

the single fan or air movement system provided in the stand or base for each portable fragrance object is activated time sequentially two or more fans or air movement systems, each provided in the stand or base for each portable fragrance object, are activated simultaneously one or more fans or air movement systems are activated using an app running on a smartphone or other device an axial fan or centrifugal is positioned underneath each portable fragrance object fan diameter size for a centrifugal fan, including its case, is within the range 40 mm to 60 mm, and in one implementation 51 mm fan or air movement system peak airflow for each fan is between 0.02 and 0.12 m3/min and in one implementation is 0.06 m3/min or 2.1 CFM.

noise level for each fan or air movement system is average of 26 dB in free air the portable fragrance object itself includes no fan or air movement system the system includes one, two, three, four or five fragrance objects resting on the stand.

stand is mains electricity powered.

stand is essentially cuboid in shape.

stand has a generally flat top surface configured to receive one or more portable fragrance objects stand is portable Stand is integrated into a device, such as a car dashboard.

Activating the Fragrance Object

User picks up and returns a fragrance object to the stand to activate the fan or air movement system for that fragrance object.

When a user picks up a fragrance object from the stand, the air nozzle in the stand for that specific fragrance object lifts up or stays lifted up to indicate that it will be active when the user returns that fragrance object back down to the stand so that it sits on the lifted up nozzle.

portable fragrance object is mechanically lifted up from the stand or base when fragrance is to be released from the fragrance object.

portable fragrance object is mechanically lifted up from the stand or base when fragrance is to be released from the fragrance object so that air can be passed over or through the fragrance object and pick up fragrance from the fragrance object and be released into its surroundings.

portable fragrance object engages with an air nozzle or aperture in the stand or base, the nozzle or aperture leading air from the fan or other air movement system into the portable fragrance object air nozzle in the stand or base is fixed to a support or member that lifts the nozzle into engagement with the portable fragrance object when air is to be blown through or around the portable fragrance object and withdraws the nozzle from engagement when air is no longer to be blown through or around the portable fragrance object.

air nozzle in the stand or base is fixed to a support or member that lifts the nozzle into engagement with the portable fragrance object when air is to be blown through the portable fragrance object, and the air nozzle or other cam also lifts up the portable fragrance object, or a part of the portable fragrance object, to enable fragranced air to escape from the portable fragrance object air nozzle in the stand or base is positioned flush with the top surface of the stand or base when not engaged with the portable fragrance object.

region around the air nozzle or aperture in the stand or base illuminates automatically when a portable fragrance object is sufficiently close to that nozzle or aperture.

stand or base includes a light source under each fragrance object and when the fan or air movement system for a specific fragrance object is active, then the light source is active and illuminates the translucent or semi-translucent shell.

Connectivity Features an app running on a user's smartphone is used to program the release of fragrance from specific fragrance objects the app is programmed to control the release of fragrance from specific fragrance objects at user defined times in the future the system tracks the consumption or use of the fragrance object and automatically alerts the user when a replacement object is needed.

the system tracks the consumption or use of the fragrance object and automatically alerts the user when a replacement object is needed by sending a message to a companion app running on the user's smartphone

- the system tracks the consumption or use of the fragrance object and automatically alerts the user and/or a remote fulfillment server when a replacement object is needed and automatically sends a request to a fulfillment (e.g. total time it has been used; or total time, together with factor that varies according to the fan strength used) that in turn causes a replacement fragrance object to be sent or otherwise supplied to the user.
- the system automatically introduces fresh fragrances not specifically selected by a user to minimize the risk of the user de-sensitising to a specific fragrance
- the system automatically introduces a fresh coffee fragrance not specifically selected by a user to minimize the risk of the user de-sensitising to different fragrances
- different fragrance objects are activated by selectively activating a fan or air movement system that is specifically associated with only the fragrance object to be activated.
- each portable fragrance object includes an RFID tag or other form of identification chip that is recognized by the stand; the tag may include fragrance information, manufacturing or batch information and a security key so that only authorized fragrance objects will work with the stand.
- The stand creates or stores a record of the extent of use (e.g. time) associated with a specific ID chip and will not operate with a fragrance object with an ID chip that has significantly outlasted the anticipated extent of use or lifetime of a fragrance object.
- Fragrance system is configured to fragrance a room, office, building, car, bus, train, aeroplane, or any other environment.

Appendix 2 ZenAura Hardware Specification

1 Main System Components

The ZenAura system is based on a platform or stand, called the diffuser, which supports placements of containers of fragrances, called Pearls.

1.1 The Pearls

A Pearl is made up of

The glass cosmetic container

The puck which is the infused fragrance substrate.

A plastic holder for the substrate which will also serve to direct the air flow around the substrate An ISO 14443A 13.56 Mhz RFID inlay type 2 tag for identification purposes 1.2 The Diffuser The diffuser will be a cosmetically pleasing carrier and will perform the following basic functions.

Act as a WiFi device which will connect to smart phones and the web

Will detect the presence of a pearl, read its RFID tag, and forward on the data to the cloud.

Will generate airflow to the pearl(s) to diffuse the fragrance it contains.

Will raise and lower the pearl(s) to allow the airflow around it

Will light up the pearl(s)

There will be three types of diffuser available.

1. Single pearl diffuser
2. Three pearl diffuser
3. Five pearl diffuser

Figure 21:
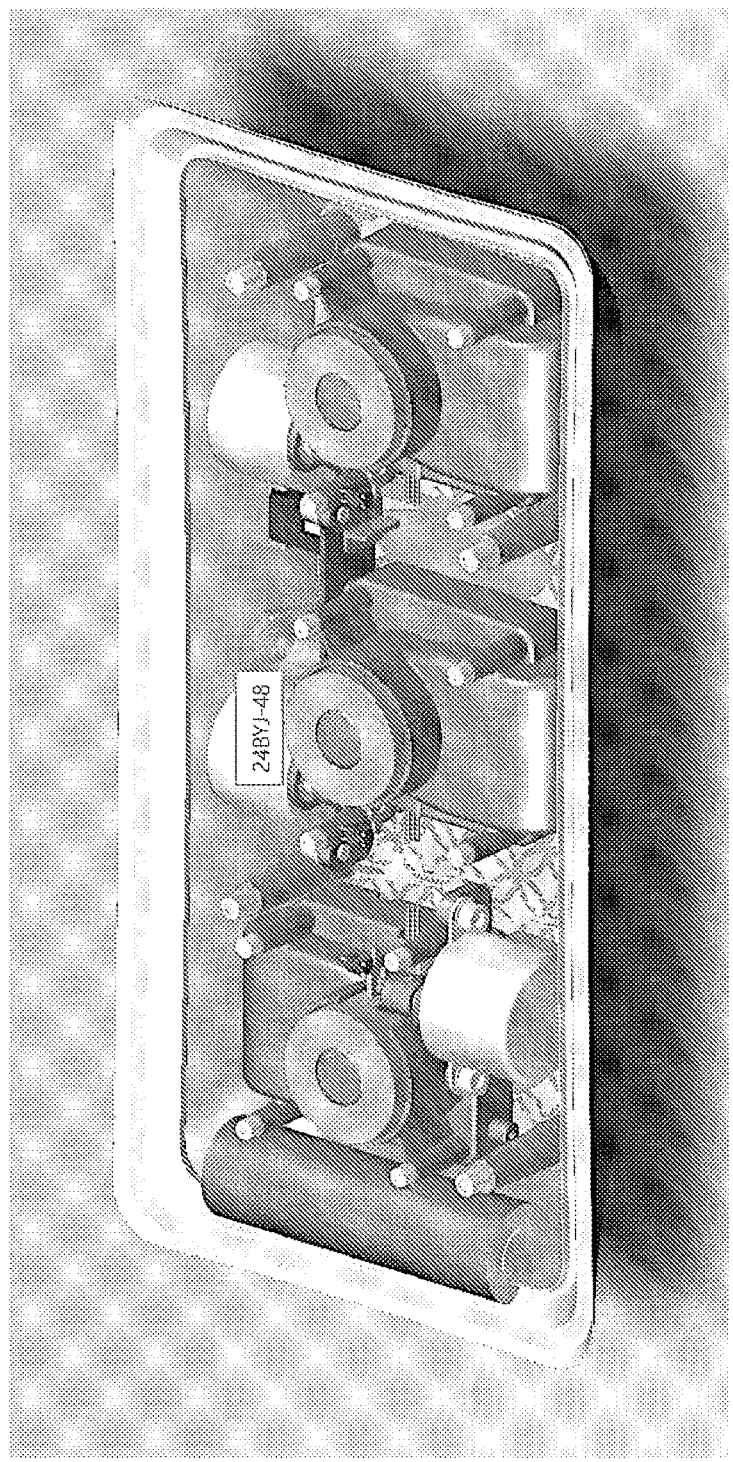
FIG. 21 is a view of inside the stand or diffuser, showing three fan units

FIG. 21 shows the internals of the 3-Pearl diffuser.

Figure 22:
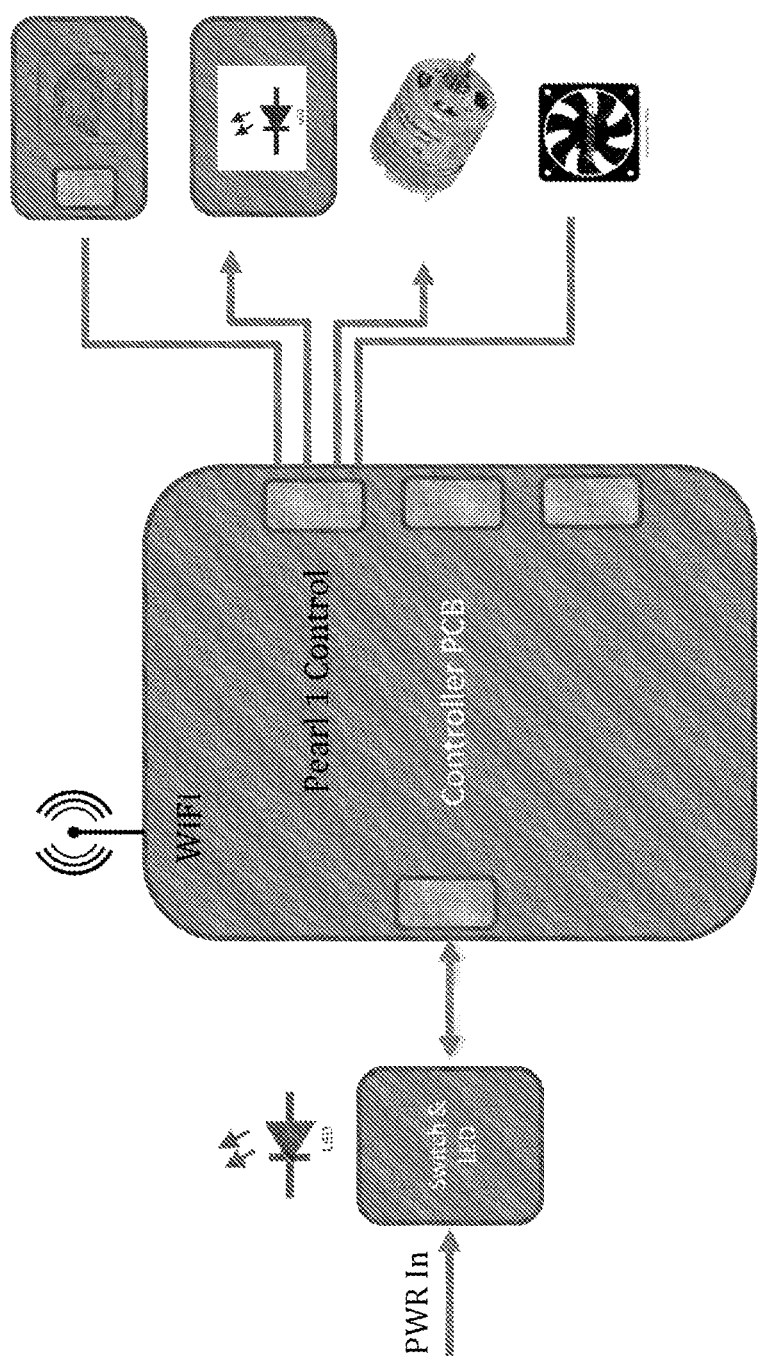
FIG. 22 is a system level diagram of the electronics of the stand/diffuser.

A system level diagram of the electronics of the diffuser is shown at FIG. 22. It comprises a main PCB with WiFi, RFID and interface chips, a simple power input PCB with switch and barrel connector, and the components associated with each Pearl station, ie an RFID antenna, LEDs, motor and fan.

2 The Diffuser or Stand 2.1 Controller PCBA Functional Description

Figure 23:
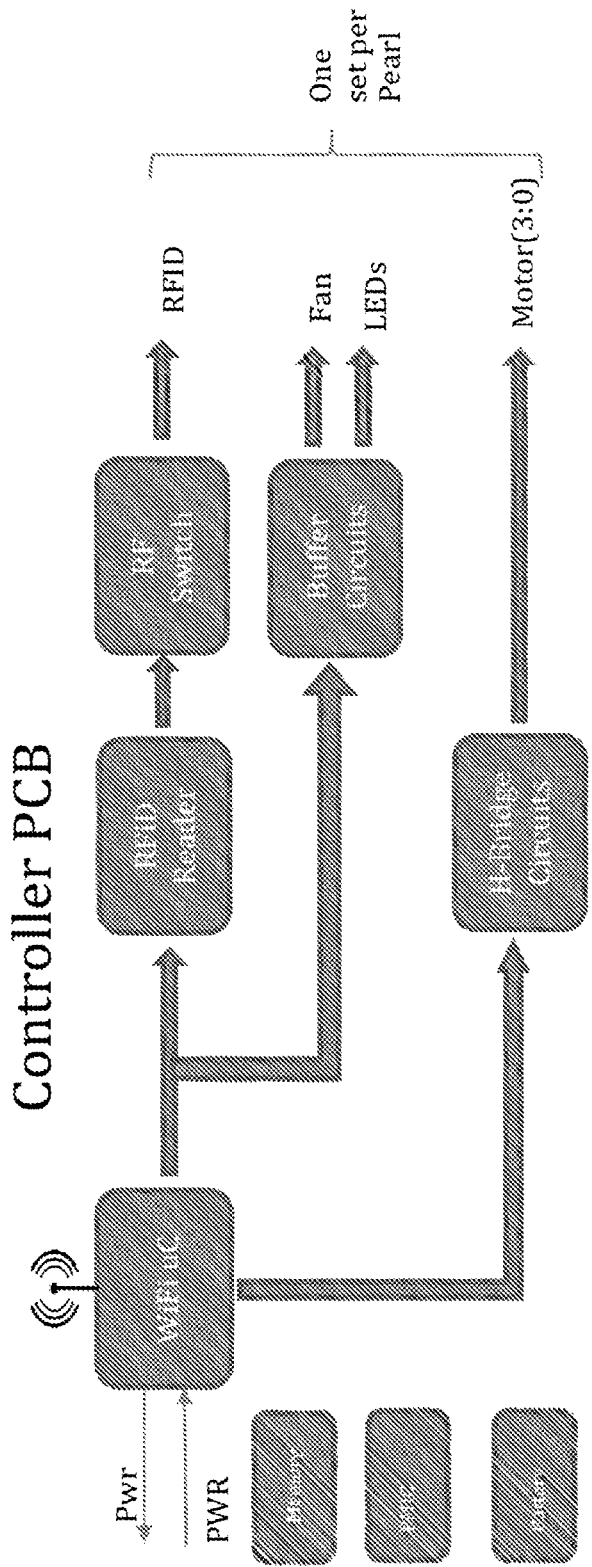
FIG. 23 is a schematic for the controller PCB in the stand/diffuser.

There will be a controller PCB attached to the central Pearl station. It will contain all of the electronics for the system apart from the switch PCBA, and the motors, fans and LEDs in the individual Pearl stations, as shown in FIG. 23. The controller PCBA fulfils the following functions WiFi Interface WiFi Provisioning WiFi Security OTA Software Upgrade MQTT decoder Switch and led control Pearl information gathering via the RFID tags.

Controlling the operation of the LEDs, motor and fan in each individual Pearl station 2.1.1 WiFi The WiFi will be implemented may be implemented as a chip laid out directly onto the PCB. The antenna will also be laid out on the PCB according to the recommendations given by TI. The WiFi circuit should be positioned so that the RF is not interfered with by the rest of the circuit and the antenna has a clear "view" of the front of the diffuser. Consideration needs to be given to the material used in the case and bezel to ensure that it does not unduly attenuate the WiFi signal 2.1.2 Connection to Pearl Station The connectors for the motor, and fan signals shall be placed so that the cables for all three stations can be short and all the same length.

2.1.3 Motor Signals

Figure 24:
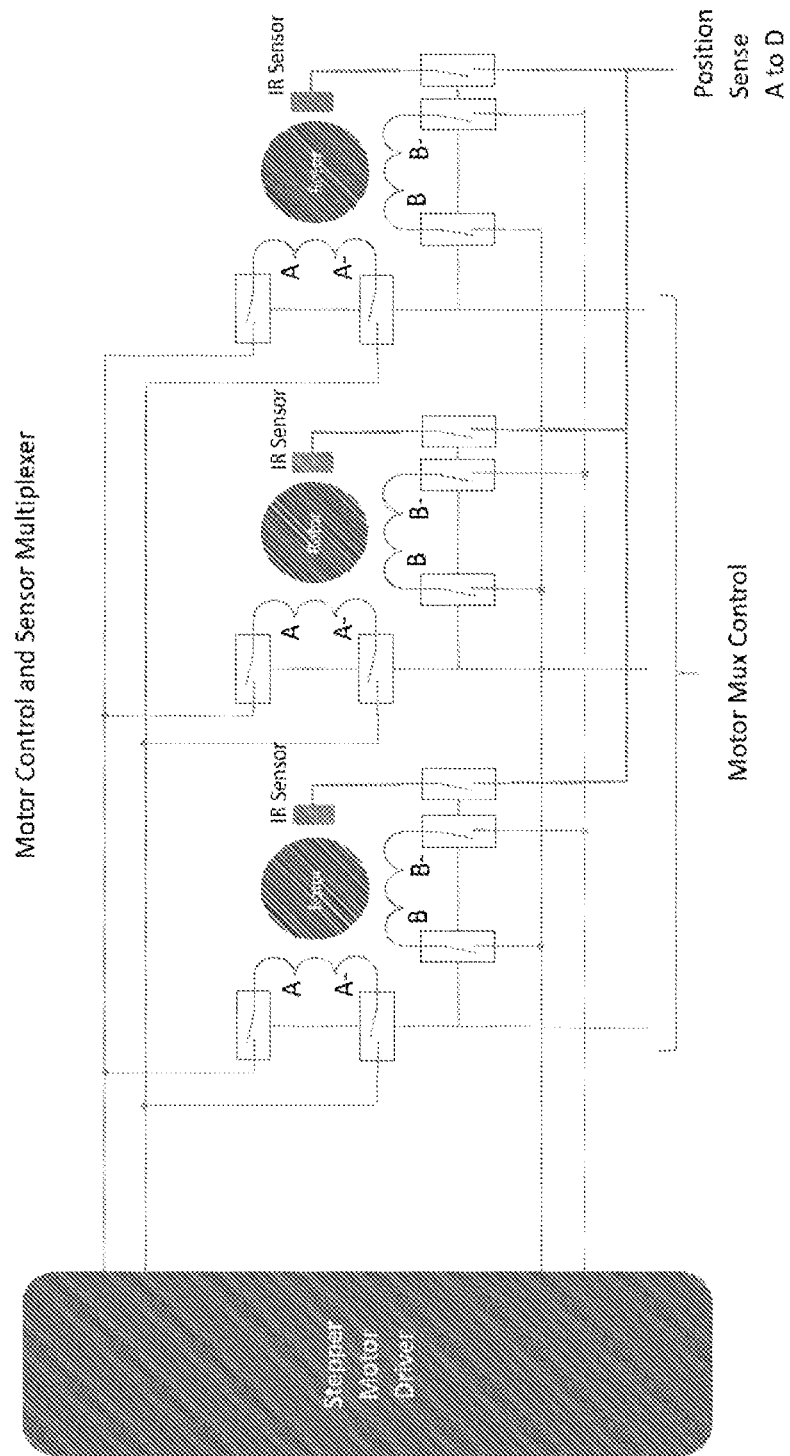
FIG. 24 is a schematic for the motor control and sensor multiplexer in the stand/diffuser.

The MCU will generate the phase signals for the stepper motor. These will be translated to bi-polar signals by a specific h-bridge driver. It is only necessary to drive one motor at a time, which means that the output of a single driver chip may be used to control all motors in the system. The signals can be individually controlled by means of analogue switches or FETs. Consideration should be given to back EMF and any damage that this might cause. This will also have the advantage of using less GPIO from the processor. The position of each motor will be determined by an IR switch which will be interrupted by the movement of the CAM. To save circuitry the output from all three IR switches will be multiplexed together again with FETs or an analogue switch to an AtoD input on the processor, as shown in FIG. 24.

2.1.4 LED Signals

Figure 25:
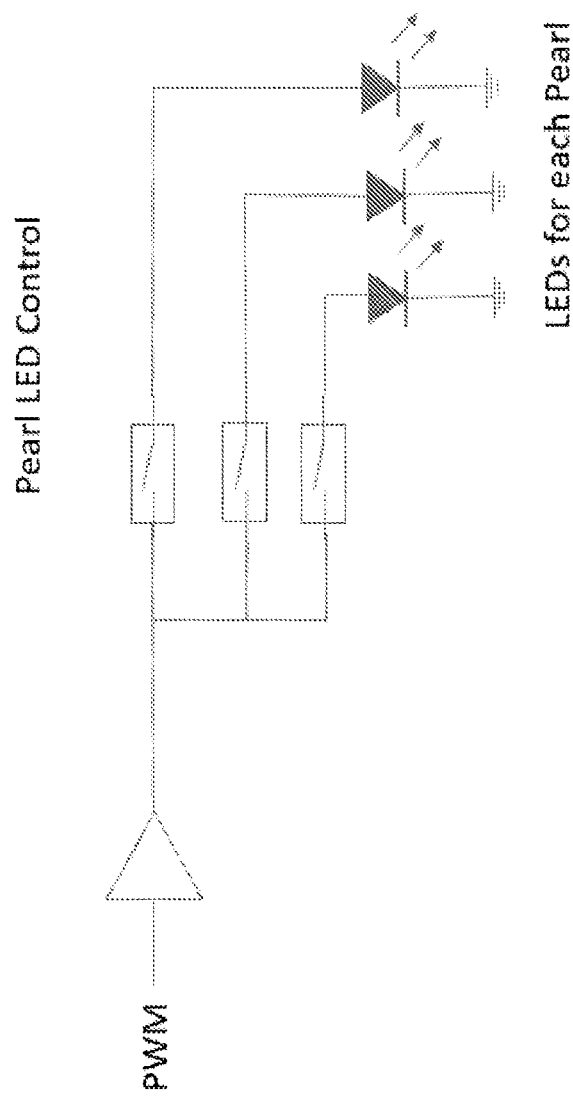
FIG. 25 is a schematic for the LED control in a portable fragrance object.

The buffer for the LEDs can be a simple transistor. The intention is to use one PWM signal to control the variable brightness of the LEDs on driver all three pearl stations. However, there will need to be a switch to turn each off individually. FIG. 25 shows this.

2.1.5 Fan Signals

Each fan will need to have its speed controlled separately. Again simple transistor buffers should be adequate to drive the fans themselves. Note that fans have considerable inertia and back emf which means that it is difficult to accurately control their speed by PWM'ing their supply. Four wires fans with separate PWM signals may be required, although these are likely to be more expensive.

2.1.6 Power Supply

Figure 26:
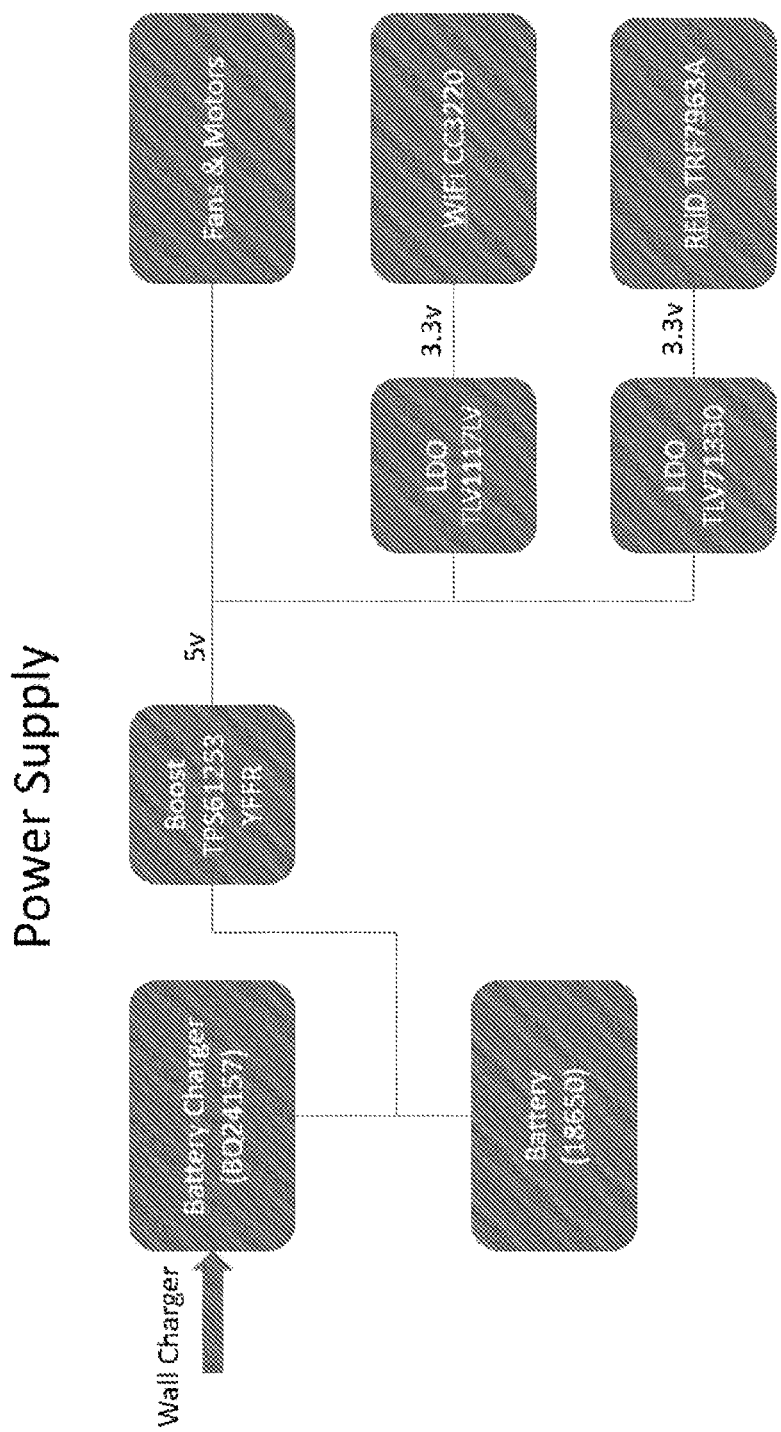
FIG. 26 is a schematic for the power supply architecture.

The power input will come from an external mains to dc supply via the Power PCB. The power will have to be regulated down for the digital circuitry and will also be supplied to the fan and motor. Careful consideration will be given to the layout and decoupling so that the electrical noise generated by the motor and fans does not adversely affect the more sensitive electronics parts such as the RFID readers and RF, and the WiFi controller and RF. A possible power architecture is shown in FIG. 26.

2.1.7 Battery

Provision should be allowed for an 18650, or similar, lithium ion battery to be placed in the diffuser. The battery will require a PMIC that will need to charge it as well as up convert its output to the various power supplies required, including the fans and motors. The battery voltage should be supplied to an A to D input into the processor to give an approximate indication of the battery charge state. The system will also require a button cell to maintain an RTC. Current should only be drawn from the button cell when the diffuser is not plugged into a power supply, or the rechargeable battery is flat.

2.1.8 RFID

Figure 27:
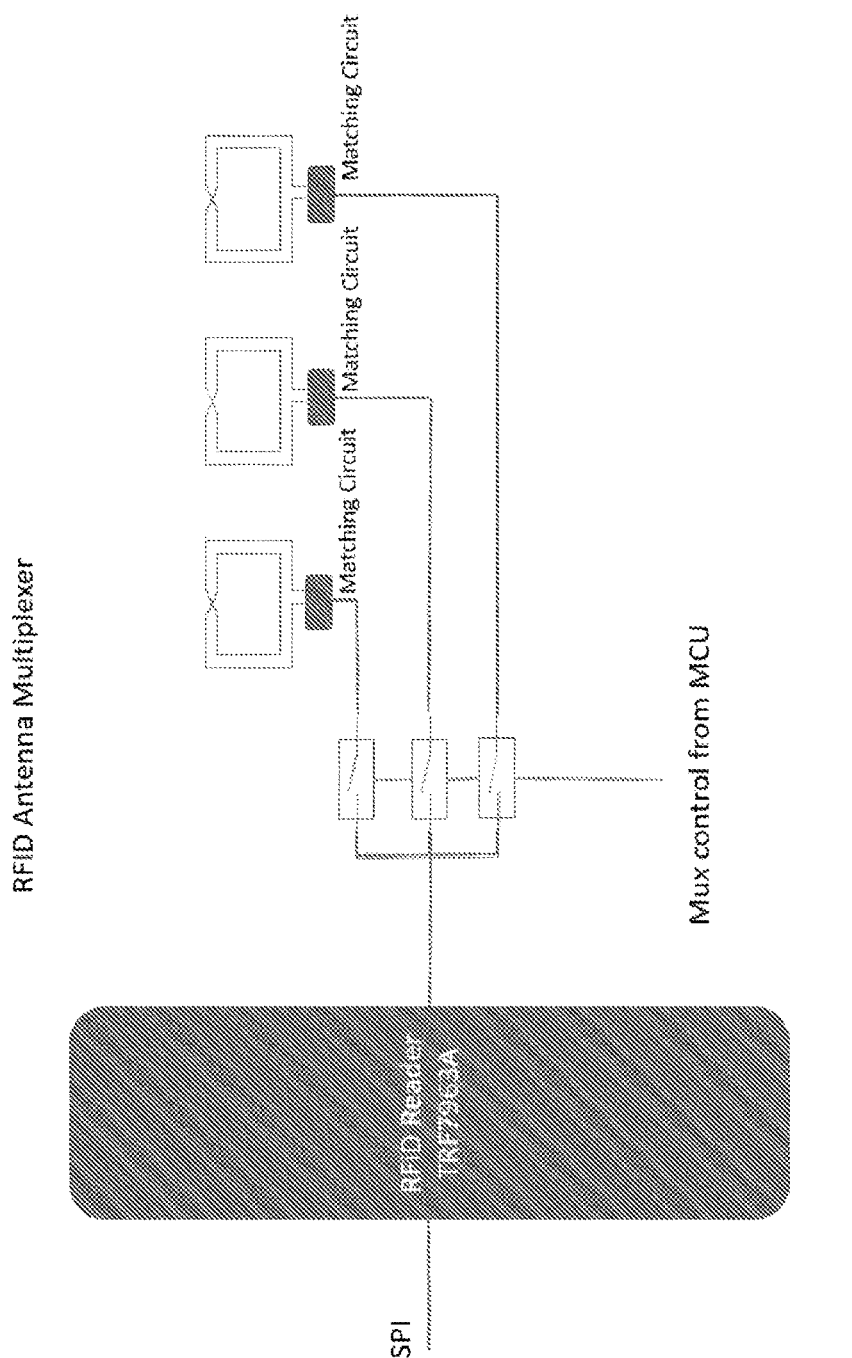
FIG. 27 is a schematic for the RFID antenna multiplexer.

The RFID antenna for the each of the pearls will be laid out on the main PCB, which will be extended to cover the three pearl stations, as shown in FIG. 27.

It is hoped that a single RFID reader chip will be able to read all three pearl stations by multiplexing the RF connection to each antenna. There are specific RF multiplexers that might be used, but also analogue switches should have the required bandwidth to be used. These are much cheaper and more readily available than specific RF chips. The layout of the tracks on the PCB will be crucial to achieve a good design. The RF signals should be laid out as a controlled impedance tracks and simulate a coax cable. Any noisy digital signals should be kept well away from the RF routing. The RFID antennas should be well clear of any ground plane. The mux should be one that is matched to the circuit, has minimum injection loss and return loss at the RFID frequencies.

2.1.9 Apple Co-Processor

The apple co-processor will be laid out on the PCB, but the current plan is that it will not be fitted.

2.1.10 PCB

Figure 28:
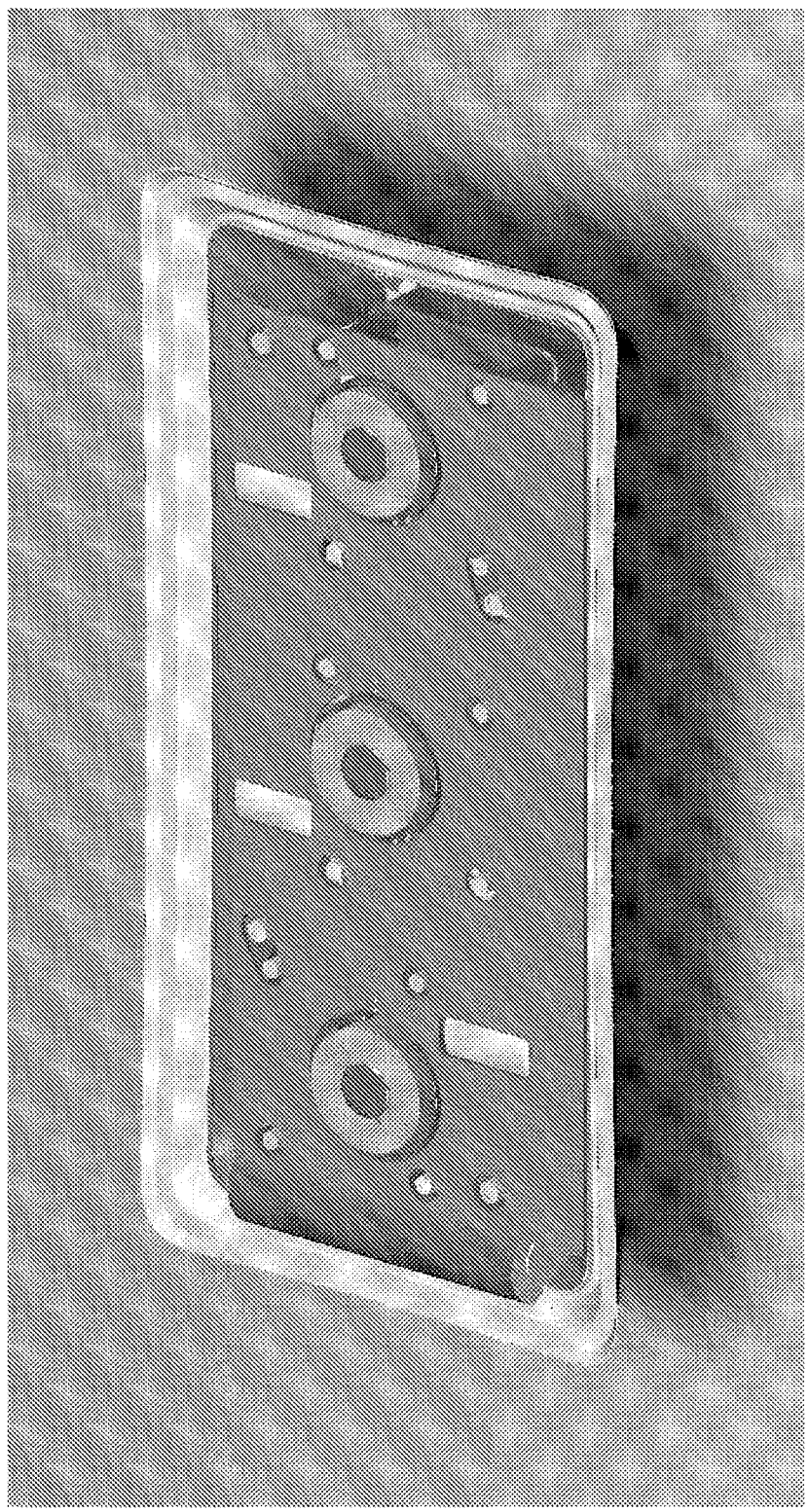
FIG. 28 is an example of the PCB shape and placement in the stand.

The main controller PCB should be laid out so that it fixes horizontally in the diffuser. This will allow it to incorporate the RFID antennas. An example of the PCB shape and placement is in FIG. 28.

It is anticipated that the layout will require 4 layers.
Finish will be immersion gold.
Thickness will be 1.6 mm
Substitute Specification: Clean Copy 20).
Copper may be 0.5 oz or 1 oz.

2.2 Controller PCBA Main Components

| Component | Part Number | Manufacturer | comments |
|---|---|---|---|
| MCU & WiFi chip with 256 kbytes RAM | CC3220 SimpleLink | Texas Instruments | |
| EEPROM | | | 16 Mbit |
| WiFi RF Filter | DEA202450BT-1294C1-H | Taiyo Yuden | Or alternative |
| RFID Reader | TRF7962A | Texas Instruments | 13.54 MHz, ISO 15693 |
| RF Switch | PE42440 | Perigrine | Or alternative |
| Motor driver | DRV8835DSSR | Texas Instruments | Or alternative |

-continued

| Component | Part Number | Manufacturer | comments |
|---|---|---|---|
| Battery Charger | BQ24157 | Texas Instruments | Or alternative |
| Boost | TPS61253YFFR | Texas Instruments | Or alternative |
| 5 v to 3.3 v for CC3220 | TLV1117LV | Texas Instruments | Or alternative |
| 5 v to 3.3 v for TRF7963A | TLV71330 | Texas Instruments | Or alternative |
| Rechargeable Battery | 18650 | | |

2.3 Microcontroller I/O

| MCU Pin | Signal Name | I/O | Description |
|---|---|---|---|
| | Pearl_Motor (3:0) | Output | Motor drive signals |
| | Pearl_MotorPos | Input | A to D from IR sensors |
| | Pearl_LED | Output | PWM |
| | Pearl1_Fan | Output | PWM |
| | Pearl2_Fan | Output | PWM |
| | Pearl3_Fan | Output | PWM |
| | SPI | Control | SPI to RFiD reader |
| | RFiD Control Mux(1:0) | Output | Controls which Pearl is switched to RFiD reader |
| | Motor Mux(1:0) | Output | Control which motor is enabled, and which IR sensor is being read |
| | LED Enable (2:0) | Output | Enable for the LED |
| | Power Switch | Input | Power on/off, and provisioning |
| A to D | Battery Status | Input | A to D for the battery voltage |

2.4 Signals to Power & Switch PCBA

| Signal | Input/Output | Description |
|---|---|---|
| Power | Input | 5 v |
| GND | Input | Ground |
| Switch | Input | On/Off, long press indicates request for provisioning |
| Red LED | Output | PWM Signal |
| White LED | Output | PWM Signal |

2.5 Power & Button PCBA

There will be a small PCB A containing:
The main power switch.
The power connector.
LEDs (red).
Connector to transfer power to the controller PCB

2.5.1 Implementation

The power PCB will be mounted onto the diffuser case close to the power input. The output from the power switch will feed into a GPIO on the MCU.
The power switch will:
Short button press Will toggle the diffuser between standby and active modes
Long button press Provisioning mode
Note that during transportation the processor will be in the MCU Shutdown mode and the NWP will be Network disabled mode (nRESET low). A button press in this state will put the diffuser into provisioning mode.

3 Pearl Fan Station

Figure 29:
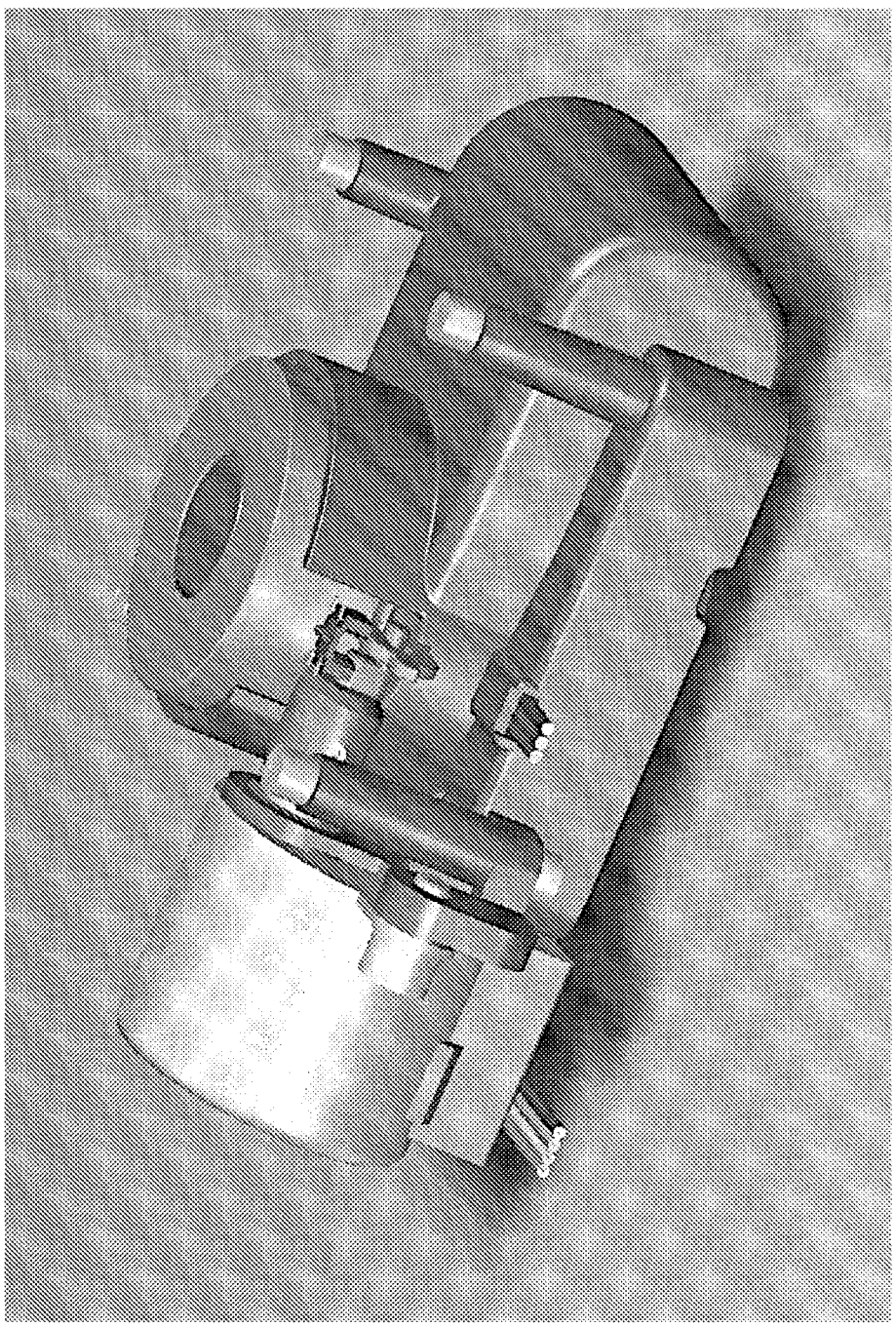
FIG. 29 shows the fan unit, including a motor, fan, airflow director and cam to lift the fragrance object.
Figure 30:
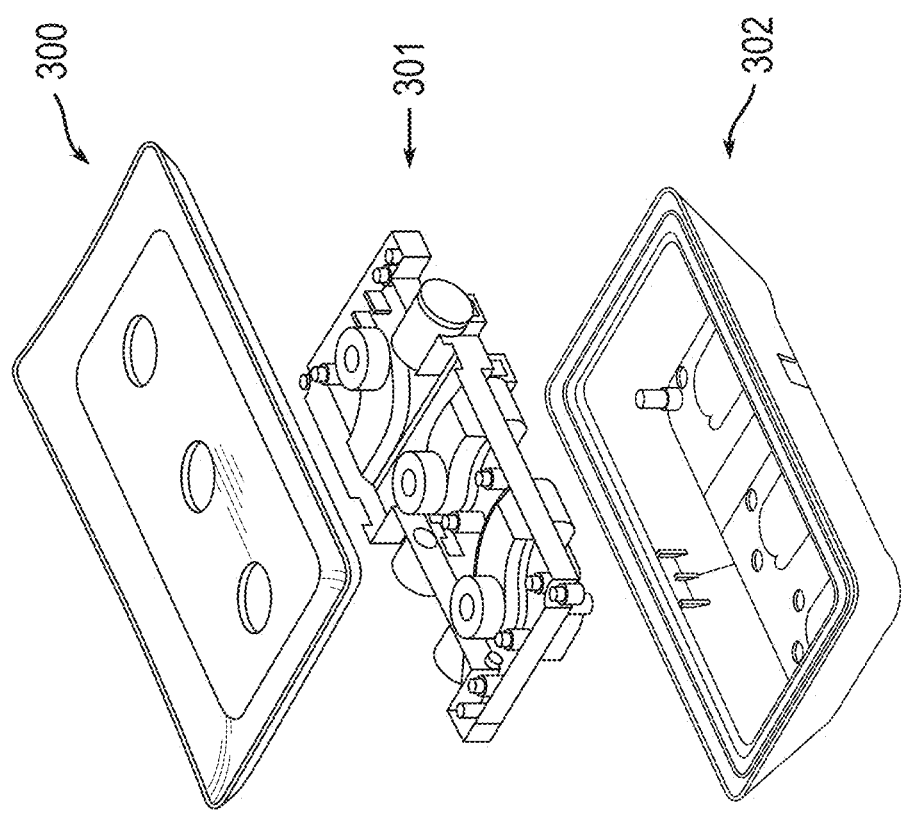
FIG. 30 shows three fan units assembled together in an exploded stand.
Figure 31:
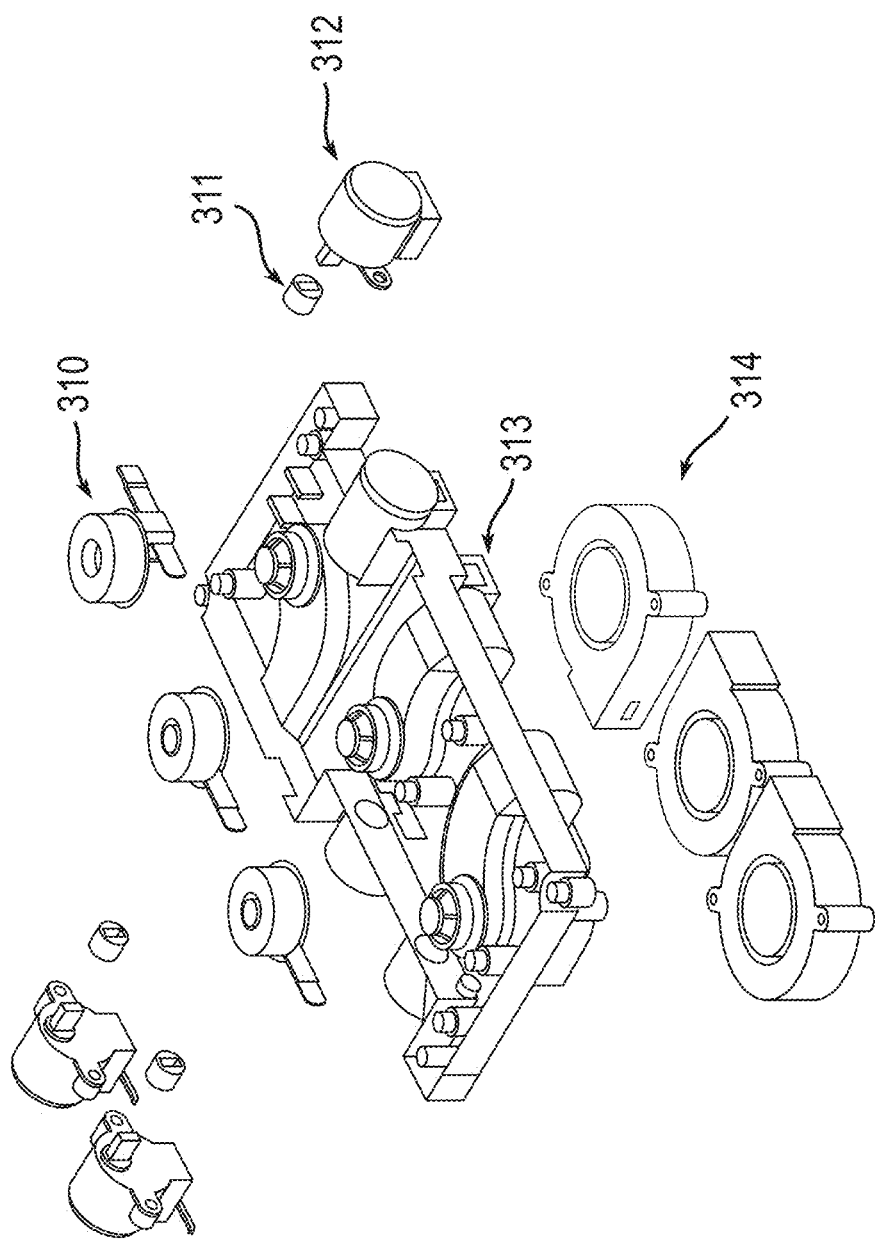
FIG. 31 shows an exploded view of the triple fan unit.

A schematic of the Pearl fan station is shown in FIG. 29. The motor and worm gear are visible at the front and the fan underneath. FIG. 30 shows how three fan stations are joined together to form an internal chassis assembly that sits under the top of the stand 300 and the base 301. FIG. 31 shows 3.1 Pearl Station Components FIG. 31 shows how each Pearl station has:
Motor 312
LED PCBA
Centrifugal Fan 314
CAM or eccentric drive 311 to raise the nozzle 310.
Mechanics to direct the airflow from the fan into the pearl;
Chassis moulding with integral fan ducting and nozzle running grooves 313

3.2 Stepper Motor

The stepper motor needs to raise and lower the Pearls on command. It will be geared to provide enough to torque to overcome the inertia of the CAM.

3.3 Fan.

The fan will be controlled by a PWM signal from the controller PCB at 25 kHz or more
The fan will be of the two-wired type, ie no tacho
It should be quiet and powerful enough to distribute the fragrance around a large room.
Consideration should be given to air flow. Will it be better to have the fan push or pull air through the Pearl and Pearl station? Is there enough of a gap to the base of the diffuser to allow air to be drawn quietly and efficiently.

3.4 RFID Antenna

The RFID antenna will be tracks on the man controller PCB. The tracking to the antenna should be impedance controlled and act like a coax cable.

3.5 Motor Position Detection

The controller will need to know the position of the motor in order to re-sync it periodically. This will be done by the use of an I|R|tx/rx pair which is interrupted by the CAM movement driven by the motor. This will feed an A to D input on the MCU.

Appendix 3 ZenAura IoT System

This Appendix 3 will act as both a description of the top-level requirements of the ZenAura IoT System and a definition of the various phases of the project that are part of the actual RFQ.

4 Main System Components 4.1 Product

Called a Pearl, which is a container for fragrance with an attached RFID tag. A Pearl is a consumable product that will need to be replaced after a certain amount of usage, e.g. a month for a typical user.
There are many different types of Pearls. During manufacture of the Pearls the type of pearl will be matched against the tag UID and uploaded into the IoT cloud database.

4.2 Device

Called a Diffuser, on which 1,3 or 5 pearls can be placed. The device has
1,3 or 5 RFiD antennas, each one can read the UID (Unique ID) of the tag of the pearl that is placed on top of it.
A LED for each pearl position, whose brightness can be controlled from 0-100
A fan for each pearl position, whose speed can be controlled from 0-100
A WiFi connection to the cloud.
A processor to register the Pearl, and "play" the Pearl by controlling an LED and the fan. The speed of the fan controls the fragrance release.
The device is responsible for detecting the presence of a Pearl and sending the UID to the IoT cloud control.

4.3 App

The App connects the user to the IoT cloud and to the device. It has the following functions
Logs the user onto the system
Initiates the WiFi provisioning of the Diffuser
Shows to the user the type of Pearl that is placed on the diffuser
Controls the Pearls placed on the Diffuser, ie play them under user command.
Allows the user to set up a schedule to "play" the pearls.
Has downloadable information on editorial
Allows purchasing of more Pearls and Diffusers via a webpage access to a Web based commercial purchasing system such as Shopify.

4.4 IoT System

Acts as a Publisher for messages between App and Diffuser.
Holds a database of all Pearls and Diffusers manufactured.
Holds the real time status of all Pearls and Diffusers.
Holds a list of all commands addressed to the Pearls and Diffusers
Enables Actions to be made on the Diffuser.
Allows rules to be run on the Pearls and Diffusers
Allows interrogation of system usage and user behaviour to provide analytics for marketing purposes.
Interfaces to a CRM system that holds customer details, credit card, login, etc
Will publish a message initiating an OTA download when necessary 4.5 Webpage User login and details setup, including credit cards, passwords, etc.
Will allow control of the diffuser, although it is not expected to be commonly used to do so.
Will hold marketing material for the product and provide a business presence for Zenaura Ltd 4.6 General Server A server will hold marketing information to be downloaded to the App and Webpage
Will hold Diffuser software updates for OTA download.

5 Current IoT Platform 5.1 Objects

The current platform has the concept of objects, eg
A diffuser.
Pearl
User
App/Phone 5.2 Diffuser and Pearl Databases Note that there are/will be different types of diffusers and pearls. The diffuser and pearl objects are set up as they are manufactured by importing some kind of databases, maybe just a CSV files, into the system from the manufacturers. When they are imported they get assigned unique IoT IDs.
The database for the diffuser will contain
The serial number of the diffuser.
The mac address of the diffuser
The type of diffuser
Hardware version
Software version
Date of manufacture Hours of Operation
User Name (will be "Zenaura" until assigned by the user)
The database of the pearls will contain
Unique ID
Pearl type
Pearl fragrance type
Date of manufacture
Fragrance Batch Number
Usage (strength x time)

The user is set up when they log into the App or website for the first time.

5.3 Collections

When these objects get used they get put into collections that are logically linked together, by their unique IoT ID. The process will be something like:

1. A user purchases a diffuser(s)/pearl(s) and downloads the App
2. The user signs-in for the first time, and gets assigned a unique IoT ID.
3. The user uses the App to provision a diffuser. The IoT system links the diffuser and user via their unique IoT IDs, so that only the user can adjust the settings of the diffuser.
4. The IoT database informs the App of the fact that the diffuser is now provisioned and assigned to that user/App.
5. The user can assign a name to the diffuser, eg bedroom, or dining room. This name should be captured by the IoT system. One user/App can of course control as many diffusers as they have purchased.
6. The user will then place pearls on the diffuser. The diffuser will read their UIDs via RFID and report the UID to IoT system.
7. The IoT system links the diffuser and the pearls on it together. The IoT system informs the App that the pearl has been placed on the diffuser (or removed), and what type of pearl it is.

Note the mac address and UIDs of the pearls should be checked against the manufactured databases. If ever they do not exist or there is a flag that they have already been used, then this should be highlighted to Zenaura. Note that it should be possible to have a diffuser be controlled by more than one App/user. The mechanism to do this can be decided at a later stage.

5.4 Actions

Actions should be implemented with as little delay as possible to convey the quality of the system. Eg if a user presses play on their App the resultant action on the diffuser should happen within one second. For example: play/stop action 1. The App/user "plays" the pearl by setting the strength of the fan, the time for which it is on and pressing play.
2. The IoT system informs the diffuser of the play request and details and the diffuser plays the result.
3. A user/App "Stop" obviously sets the pearl fan and LED strength to 0

Or diffuser software update action
Zenaura define the scope of the update, eg by user, by diffuser, by existing diffuser sw version, or just all
Zenaura place the sw update on a dropbox server
Zenaura issue the update request, book the update for a particular time. IoT system informs the relevant diffuser that they need to do a software update
Diffuser indicates sw updated to the IoT system
All actions should be permanently logged in the system for future analysis.

5.5 Dashboards

To easily view the status of the diffusers, users, pearls, we will require a dashboard to be accessible for Zenaura to view. The dashboard will show the Unique IDs of the object, and its status, eg a diffuser should show
 Its unique IoT ID (UIOTID).
 The UIoTIDs of the pearls on it
 The current status, eg play strength of each fan, brightness of each led, pearl type on each rfid antenna.
 Whether the diffuser is currently connected to the IoT system (this will require a ping mechanism, say once per minute).
 The owner (App/user) UIoTID

6 AWS IoT Platform

The RFQ will be to implement a similar system based on the AWS IoT platform.

6.1 AWS Resource Name

Everything in AWS gets assigned an ARN. The App and diffuser will talk to endpoints that are determined by the ARN of the item it is communicating to. For example a diffuser ARN may look something like "am:aws:iot:us-east-1:123456789012:thing/diffuser3A_123456789abc"

6.2 Device Databases

There will be at least two databases maintained in the cloud, one for diffusers and one for pearls. After a diffuser or a pearl batch is manufactured the relevant cloud database will be updated with the details of all products manufactured, including UIDs and any other information relevant for thing generation later on. All default attributes created during provisioning will be loaded from the database.

6.3 Thing Creation

The AWS platform defines things with attributes and shadows. Things are physical devices, shadows are a JSON document that holds the status, or the requested status for the thing if it is offline. Attributes are searchable ways of describing the thing.

6.3.1 Diffuser Thing

A diffuser thing will be created at the point when the user provisions/connects it to the cloud. Its attributes will be copied from the device database to the thing at this point. Each will be created with a name (ARN) that is consistent with its UID contained in the database. It's attributes will be copied over from the database.

6.3.2 Diffuser Shadow

The diffuser shadow will be created at the same time as the thing.

6.3.3 Pearl thing

A pearl thing will be created at the point when it is first used on a diffuser. Each will be created with a name (ARN) that are consistent with their RFID UID which has been programmed in during manufacture. Initially the pearl will be assigned to an unused group.

6.3.4 User Thing

A user thing will be generated when a user initially signs in with their first App. They will therefore be generated one by one as the user logs in. Each user will have a UID that is reflected in their ARN.

6.3.5 App Thing

An App thing will be generated when a user initially signs in with an App. They will therefore be generated one by one as the user logs in. Each App will have a UID that is reflected in its ARN.

6.4 Groups

Each User will form a group within which will be placed their Apps, diffusers and pearls. Normally only one user will be allowed in any one group, and only that user can control the things within that group. For example, a pearl assigned to one user, can only be used by diffusers within the same group. A user can give permission for another user to share the group and all things within it.

6.5 Pearl Lifetime

The pearl is a commodity product and has an associated lifetime. The lifetime will be calculated by the cloud according to an algorithm that is yet to be decided, but will have as inputs Hours of use
Fan strength during use
Type of fragrance
Type of pearl
Type of diffuser Once the lifetime has expired the pearl thing will be marked as dead (or just simply deleted), the database updated to reflect this, and the cloud will log but reject any command to use it.

6.6 New User Log In

The AWS platform has user authentication process built in called Cognito. The App will use this to authenticate the user.

6.7 Provisioning a Diffuser and Initial Connection to AWS.

6.7.1 Connection Scenario

Scenario—A user has bought a diffuser, turned it on, and logged into their downloaded. They tap the add new diffuser button on their phone.

1. The user is asked to connect their phone WiFi to the SSID of the diffuser which is broadcasting in AP mode.
2. The App asks the user to enter the SSID and password of their local wifi AP.
3. The App then sends the diffuser the SSID and password, and its own user UID. It also reads back from the diffuser its UID.
4. The diffuser then stops broadcasting as an AP and attempts to connect to the local wifi in station mode. If successful it calls the AWS assignment service securely using the AWS certificate, with information containing its UID, and the User's UID.
5. The phone disconnects from the diffusers wifi once it goes into station mode, and automatically reconnects to its local AP (or is requested to do so by the App if this does not happen automatically). It then contacts the assignment service with the diffuser's UID to let it know that the provisioning process is requested.
6. The AWS assignment service waits for both the App and the diffuser to contact it with each other's UID. When both have done so it then checks that the diffuser UID is contained within the device database and that it has not already been assigned to a user/group.
   Once this is verified it creates a new diffuser thing and assigns it to the user group. It also sends message to both the App and the diffuser saying that the provisioning process was successful, they are subscribed to the group, and communication can proceed.
7. The diffuser immediately publishes its status

6.7.2 Things Going Wrong

Some action should be taken if the whole provisioning/assignment process does not complete successfully.

The diffuser UID is not recognised in the database
The diffuser UID is already assigned to a user/group
The App UID is not recognised
The process does not complete for some network issue.

6.8 Thing Ownership

Things are assigned to user groups and it is not normally possible for another user to send commands to them. However, there are exceptions.

6.8.1 a Diffuser being Shared by Other Users

It should be possible for another user to connect to an existing assigned diffuser, but permission from the original user will be required first. This permission will mean that the second user has access to the entire group of the first user.

In this case the provisioning process for the second user is unnecessary.

6.8.2 a Diffuser being Deleted by a User

A user can give up control of their diffuser by deleting it from their group. In this case the diffuser will go to an unassigned group. The diffuser must be re-provisioned before it can be used in another group.

6.9 Communication

The diffuser will use MQTT exclusively to communicate with the IoT cloud. The app will use RESTful commands or potentially AWS SNS. The App will communicate with the thing shadow, which will then update the Thing and the physical diffuser.

6.10 OTA Updates

The AWS IoT platform provides a service to perform remote actions on multiple devices. These are references as Jobs. An OTA mechanism will be a job that will be required by Zenaura.

6.11 Zenaura Device Management

Zenaura will need to be able to monitor usage of diffusers and pearls and to analyse the usage with a number of algorithms. The exact method of doing this has yet to be determined, but a thing registry will be helpful.

The AWS Device Management Service provides an API.

7 CRM Interaction

The CRM system will have access to the IoT database for:

Customer support
Business Intelligence
Device Management

Figure 32:
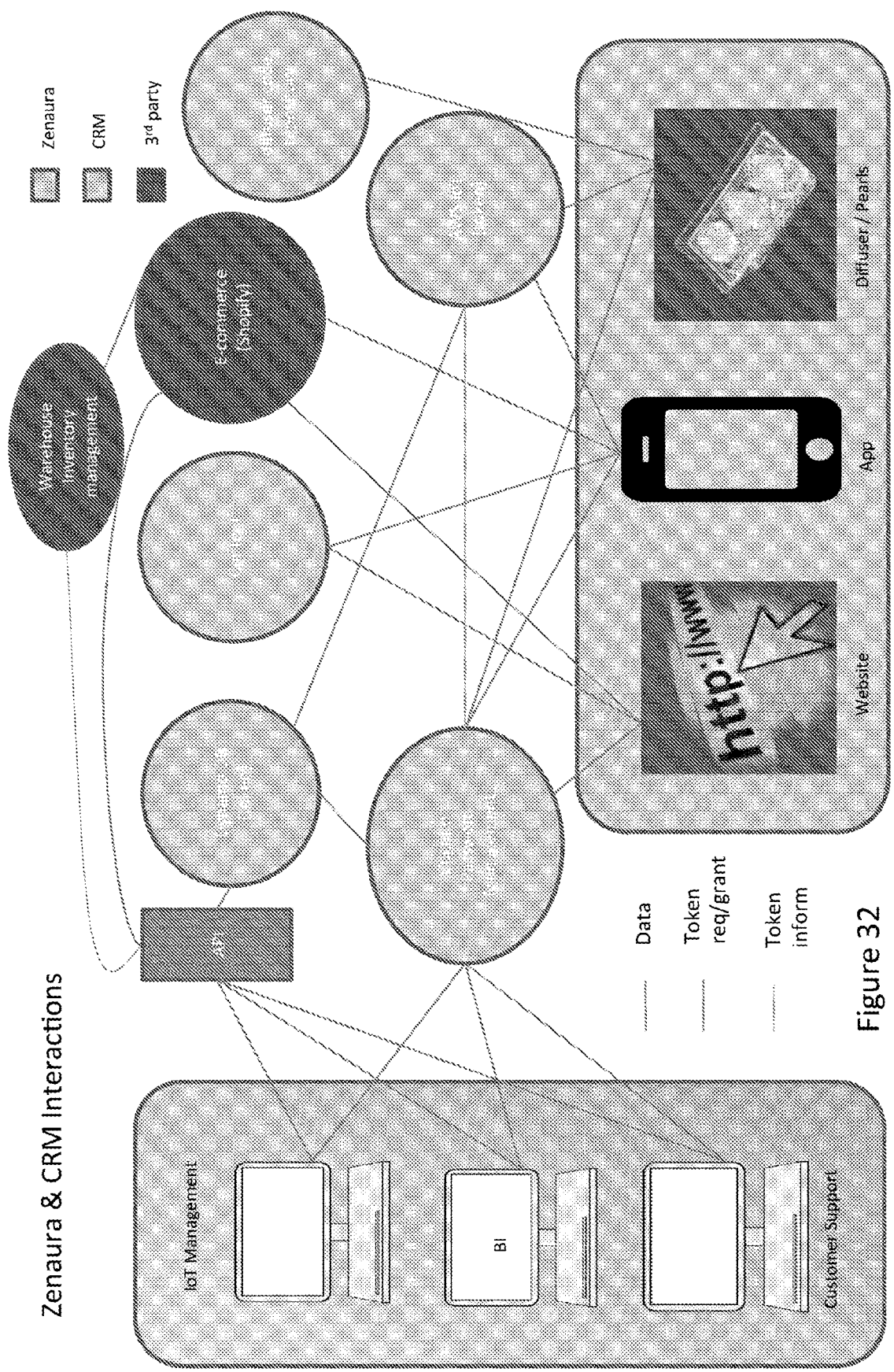
FIG. 32 shows the IoT architecture of the system.

A top level diagram of the system is shown at FIG. 32. This shows the pathway of information and security token management between the hardware, IoT management system and database, the CRM system and other $3^{rd}$ party applications such as the warehouse and shop system.

The API between the IoT system and the CRM system will look like the following:

7.1 Information Record

| | |
|---|---|
| User Info | name, region, gender, city/state |
| User Owned Info | Diffusers IDs, pearl IDs, group IDs, App IDs |
| Diffuser Static Info | Owned by, serial number, hw type, sw version, hw version, manufactured date, shipped date, first connected date |
| Diffuser Dynamic Info | Wifi connected, battery status, mains connection, play status (pearl IDs, fan state per station), brightness setting |
| Pearl Info | Glass type, fragrance, fragrance batch no, moulding date, shipped date, first used date, lifetime calculation, linked list of usage and strengths |
| Group Info | No of users in a group, user names |
| App Info | App OS, loaded date, version, list of analytics |

7.2 Status

| Message | Arguments | Reply |
| --- | --- | --- |
| User Status | User ID token | User Info |
| User Owned | User ID token | User Owned Info |
| Diffuser | Diffuser ID | Diffuser static info, diffuser dynamic info |
| Pearl | Pearl ID | Pearl Info |
| Groups | Group ID | Group Info |
| App | App ID | App Info |

7.3 Add/Remove

| | | |
| --- | --- | --- |
| Add diffuser to user | User ID, diffuser ID | Ack |
| Remove diffuser from user | User ID, diffuser ID | Ack |
| Add pearl to user | User ID, pearl ID | Ack |
| Remove pearl from user | User ID, pearl ID | Ack |
| Sign Up User | User email, password | User ID |
| Delete user | User ID, group ID | Ack |
| Add user to group | User ID, group ID | Ack |
| Remove user from group | User ID, group ID | Ack |

7.4 Business Intelligence

| | | |
| --- | --- | --- |
| List diffusers (active/non-active, all, by group, by owner) | By: all, owner, assigned, non-assigned, connected, non-connected, name, date (manufactured, shipped, connected, last used), group | Data |
| List pearls | By: all, owner, assigned, non-as signed, connected, non-connected, name, date, group | Data |
| List Owners | By: all, name, gender, country, city/state | Data |
| List groups | By: all, including user | Data |
| List Apps | By: all, OS date downloaded | Data |

7.4.1 Updating Variables and Algorithms

| | | |
| --- | --- | --- |
| Lifetime algorithm | Time(%) *strength(%) for every fragrance | Ack |
| Lifetime value | Per fragrance | Ack |
| Lifetime strength | Modifier to fan speed (every 10% of life) | Ack |
| Fragrance Types | List of all available fragrances | Ack |
| Diffuser types | Type list | Ack |
| Pearl Types | Type list | Ack |

8 Downloadable Content

We have an area in AWS to hold downloadable content for the App including editorial, shop.

9 App Messaging

Example messages to/from the App

| Action Type | Action Description |
| --- | --- |
| ProvisionDevice | Provision the diffuser |
| ProvisioningSuccessful | Provisioning Successful |
| ProvisioningFailed | Provisioning Failed |
| PearlAdded | Pearl Added to Diffuser |
| PearlRemoved | Pearl Removed from Diffuser |
| SetFanSpeed | Set Speed of a Fan |
| SetLightIntensity | Light Intensity |
| SetMix | Mix of Fragrances |
| SetSchedule | Set Schedule on Diffuser |
| RemoveSchedule | Remove Schedule on Diffuser |
| DeviceReset | Hardware Reset |
| Play | Play a Mix/pearl |
| FirmwareUpdateAvailable | Firmware Update Available |
| StartFirmwareUpdate | Start Firmware Update Process |
| FirmwareUpdateStarted | Device has started Firmware Update Process |
| FirmwareUpdateApplied | Firmware Update Applied |
| FirmwareUpdateFailed | Firmware Update Failed |
| DebugModeOn | Allow Trace Messages to be sent |
| DebugModeOff | Switch Off Trace Messages |
| Status Update | Eg sw, hw versions, type, etc |

10 Message Protocol

10.1 Commands

Commands will use three phases:
1. App publishes_Play command to diffuser via IoT
2. Diffuser publishes status update to app via IoT with QoS of 1 to ensure delivery
3. IoT will generate PUBACK messages to confirm receipt.
   If the diffuser doesn't receive the PUBACK then it re-transmits the status message every minute until it does.

10.2 Status Updates

Changes to the pearl RFID status will use two phases:
1. Diffuser publishes pearl RFID tag updates to IoT and via IoT to App ie _PearlAdded or ../_PearlRemoved with QoS of 1 to ensure delivery
2. IoT will generate PUBACK messages to confirm receipt
   If the diffuser doesn't receive the PUBACK then it re-transmits the status message every minute until it does.

11 Appendix 2—Example MQTT Message Format

11.1 Play Action

An example messages sent to the diffuser via the_Play endpoint is:

[{"pearlindex":0, "fanspeed":100, "lightintensity":50, "duration":10}]

The diffuser will respond by publishing its status back to/things/xxxx/attributes. This can be an array of messages with different 'timestamp' times. For example:

[{"timestamp":12345678, "key":"fan0speed", "value":100},
{"timestamp":12345678, "key":"light0intensity", "value":90},
{"timestamp":12345678, "key":"fan1speed", "value":80}, {"timestamp":12345678, "key":"light1intensity", "value":70}

11.2 Pearl Added Action

The diffuser will publish pearl ID status messages to /objects/xxxx/actions/_PearlAdded. This may be at the same time as the properties are updated or only when a pearl is added. For example:

{"type":"_PearlAdded", "projectid":"xxyyzz", "timestamp":12345678, "customFields":{"pearlindex":2, "pearlid":"ABCDEFG"}}

11.3 Pearl Removed Action

When the pearl is removed, the diffuser will publish a message to /objects/xxxx/actions/_PearlRemoved.

{"type":"_PearlRemoved", "projectid", "xxyyzz", "timestamp":12345678, "customFields": {"pearlindex":2}}

The IoT platform responds to status and pearl ID updates with a PUBACK message to confirm receipt.

Schedules can be set by publishing an array of (cron timestamp.command) pairs to __Schedule. The command is the same format as above. For example:

[{"time":"* * * * *", "command":[{"pearlindex":0, "fanspeed":50, "ledintensity":100,"duration":30}]},

12 AWS Thing Types

12.1 3 Pearl Diffuser Type

| Attribute | Type | Default |
|---|---|---|
| MAC addr | Searchable | |
| Serial number | Searchable | |
| Password | | |
| Project | | |
| No of stations | Const-3 | 3 |
| Date of Manufacture | | |
| Manufacturer | | Hansong |
| Hardware Version | | |
| Colour | | |
| Firmware Version | Searchable | |
| SKU | | |
| Name | | |
| Ship Date (to customer) | | |
| Provision Date(s) | | |
| Owner | | |
| Light Strength | | |
| Fan Strength 0 | | |
| Pearl UID 0 | | |
| Fan Strength 1 | | |
| Pearl UID 1 | | |
| Fan Strength 2 | | |
| Pearl UID 3 | | |

12.2 Pearl Type

| Attribute | Type | Default |
|---|---|---|
| UID | | |
| Fragrance | | |
| Type | | 3 |
| Colour | | |
| Manufacturer | | Hansong |
| Fragrance batch | | |
| Date of Manufacture | | |
| Date of First Use | | |
| Total Hours/Strength | | |
| User/Owner | | |
| Use (list of strength, time, start) | | |

12.3 App Type

| Attribute | Type | Default |
|---|---|---|
| UUID | | |
| Date registered | | |
| Region | | |
| Phone Type | | |

13 AWS Groups

13.1 User Group

Apps
Diffusers
Pearls
Other users

The invention claimed is:

1. A fragrance system, comprising:
(a) a stand with an upper surface;
(b) an air movement system disposed within the stand;
(c) a nozzle in fluid communication with the air movement system;
(d) a portable fragrance object seatable on the nozzle, the portable fragrance object having:
a fragrance infused substrate or matrix;
an ID chip or device;
a shell surrounding the fragrance infused substrate or matrix; and
channels on a bottom surface thereof,
wherein the fragrance infused substrate or matrix has a hole extending away from the bottom surface which is seatable in register with the nozzle, and
wherein a weight of the portable fragrance object provides a seal of apertures on the bottom surface thereof with the upper surface of the stand; and
(e) a drive connected to selectively raise or lower the nozzle;
wherein the ID chip or device triggers the drive to raise the nozzle to an elevated position in which the portable fragrance object is lifted together with the nozzle to break the seal and enable fragranced air to escape using the air movement system.

2. The fragrance system according to claim 1, wherein a gap between the channels on the bottom surface of the portable fragrance object and the stand defines a flow path for fragranced air to escape.

3. The fragrance system according to claim 2, further comprising a motor, wherein the motor is connected to the drive.

4. The fragrance system according to claim 3, wherein the drive comprises a cam configured to mechanically lift the nozzle.

5. The fragrance system according to claim 3, further comprising a controller that receives a signal from the ID chip or device and implements the triggering of the drive to selectively raise or lower the nozzle using the motor.

6. The fragrance system according to claim 2, wherein the air movement system comprises a fan.

7. The fragrance system according to claim 6, further comprising a controller that receives a signal from the ID chip or device and is configured to activate the fan when the portable fragrance object is in a lifted position to assist escape of fragranced air.

8. The fragrance system according to claim 7, further comprising a light source providing light through the nozzle for illuminating the portable fragrance object, wherein the controller is further configured to illuminate the light source when the portable fragrance object is in a lifted position.

9. The fragrance system according to claim 5, further comprising an app running on a smartphone, wherein the controller is further configured to raise the nozzle to move the portable fragrance object to the lifted position and release fragrance in response to signals from the app.

10. The fragrance system according to claim 2, further comprising a light source providing light through the nozzle for illuminating the portable fragrance object.

11. The fragrance system according to claim 2, wherein the gap that defines the flow path for fragranced air to escape results from a mechanical engagement of the nozzle with the bottom surface of the portable fragrance object due to lifting the portable fragrance object away from the stand.

12. The fragrance system according to claim 2, wherein the nozzle has a lowered position.

13. The fragrance system according to claim 11, wherein the nozzle is flush with the upper surface of the stand when in the lowered position and not engaged with the portable fragrance object.

14. The fragrance system according to claim 5, wherein the controller is further configured to store a record of the extent of use associated with the ID chip or device.

15. The fragrance system according to claim 2, wherein the portable fragrance object comprises a pebble shaped object with a longest dimension between 4 cm and 10 cm in length.

16. The fragrance system according to claim 2, wherein the shell of the portable fragrance object is translucent or semi-translucent.

17. The fragrance system according to claim 2, wherein the fragrance infused substrate or matrix comprises a polymer matrix.

18. The fragrance system according to claim 17, wherein the polymer matrix is ethylene-vinyl acetate (EVA).

19. For use with a fragrance system having a stand with an upper surface, an air movement system disposed within the stand, a nozzle in fluid communication with the air movement system, a drive connected to selectively raise or lower the nozzle, and a shell which is seatable over a replaceable fragrance assembly, the replacement fragrance assembly comprising:
 a base having a bottom surface which defines a bottom surface of the replaceable fragrance assembly and further having a top surface, wherein a plurality of channels extend through the base and surround a central hole;
 an RFID chip seated on the top surface of the base and clear of the central hole providing a signal configured to trigger the drive to raise the nozzle to an elevated position; and
 a fragrance infused substrate or matrix having a central chamber extending away from a bottom surface thereof and a plurality of grooves therein, the substrate or matrix being sized and shaped to be covered by the shell,
 wherein the substrate or matrix is seated on the base with the central chamber of the substrate or matrix aligned with the central hole of the base and the plurality of grooves providing an airflow path from the central chamber to the plurality of grooves and out through the plurality of channels,
 whereby a weight of the replaceable fragrance assembly and covering shell provides a seal of the plurality of channels at the bottom surface of the base with the upper surface of the stand; and
 whereby, when the nozzle is in the elevated position, the replaceable fragrance assembly is lifted by the nozzle to break the seal and enable fragranced air to escape through the plurality of channels.

20. The replaceable fragrance assembly according to claim 19, wherein the RFID chip is sandwiched between the base and the fragrance infused substrate or matrix.

21. The replaceable fragrance assembly according to claim 19, wherein the fragrance infused substrate or matrix comprises a polymer matrix.

22. The replaceable fragrance assembly according to claim 21, wherein the polymer matrix is ethylene-vinyl acetate (EVA).

23. The replaceable fragrance assembly according to claim 19, wherein the plurality of grooves extend into the substrate or matrix away from the bottom surface thereof.

24. The replaceable fragrance assembly according to claim 19, wherein the plurality of grooves providing the airflow path from the central chamber of the substrate or matrix define a curved surface and a curved path for airflow out through the plurality of channels.

* * * * *